(12) United States Patent
Thakker

(10) Patent No.: US 12,141,868 B2
(45) Date of Patent: *Nov. 12, 2024

(54) SYSTEM TO TRADE ATHLETES PERFORMANCE PROFILES AS STOCKS

(71) Applicant: Aryan Thakker, Rockville, MD (US)

(72) Inventor: Aryan Thakker, Rockville, MD (US)

(73) Assignee: Aryan Thakker, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,328

(22) Filed: Jul. 25, 2023

(65) Prior Publication Data

US 2024/0161189 A1 May 16, 2024

Related U.S. Application Data

(63) Continuation of application No. 17/952,224, filed on Sep. 24, 2022, now Pat. No. 11,727,490.

(Continued)

(51) Int. Cl.
*G06Q 40/04* (2012.01)
*G06Q 20/38* (2012.01)
*G06Q 40/06* (2012.01)

(52) U.S. Cl.
CPC ........... *G06Q 40/04* (2013.01); *G06Q 20/389* (2013.01); *G06Q 40/06* (2013.01)

(58) Field of Classification Search
CPC ...... G06Q 40/04; G06Q 20/389; G06Q 40/06; G06Q 30/0201; G06Q 30/0206; G06Q 50/34
See application file for complete search history.

(56) References Cited

U.S. PATENT DOCUMENTS 7,136,877 B2   11/2006   Volcani et al.
8,082,452 B2   12/2011   Jajodia
(Continued)

FOREIGN PATENT DOCUMENTS

WO   WO-2007105212 A2 *  9/2007   ............. G06Q 40/00
WO   WO 2020132021     *  6/2020   ............ A63F 13/828

OTHER PUBLICATIONS

Loizos, Connie: Do Americans want to gamble on individual athletes? Marc Lore is betting on it, Mar. 9, 2022, TechCrunch, pp. 1-4. (Year: 2022).*

(Continued)

*Primary Examiner* — Bijendra K Shrestha
(74) *Attorney, Agent, or Firm* — Raj S. Dave; Dave Law Group LLC

(57) ABSTRACT

An embodiment relates to a system comprising: a processor, a memory, and a database; wherein the processor configured to: receive a real-time data along with a real-time performance of the athlete; determine a recommendation, using a machine learning model comprising artificial intelligence of a recommendation engine, to a user of a stock of the athlete for a future period; determine, a stock price associated with the stock of the athlete in real-time based on a computation metric comprising the real-time performance of the athlete in the game and the historical performance of the athlete, wherein the stock price of the athlete is computed using a blockchain technology; wherein the blockchain technology is configured to facilitate at least one of a creation of transaction of the stock; and wherein a cyber security module is configured for providing security to the system.

19 Claims, 28 Drawing Sheets

Related U.S. Application Data

(60) Provisional application No. 63/203,491, filed on Jul. 25, 2021.

(56) References Cited

U.S. PATENT DOCUMENTS

| | | | |
|---|---|---|---|
| 8,210,916 B2* | 7/2012 | Ma | A63F 13/798 |
| | | | 463/7 |
| 8,512,150 B2 | 8/2013 | Herrmann et al. | |
| 8,566,269 B2 | 10/2013 | Jajodia et al. | |
| 8,635,146 B2 | 1/2014 | Baggott | |
| 9,203,861 B2 | 12/2015 | Albanese et al. | |
| 9,436,822 B2 | 9/2016 | Ghosh et al. | |
| 9,846,588 B2 | 12/2017 | Ghosh et al. | |
| 10,956,184 B2 | 3/2021 | Ghosh et al. | |
| 2006/0259389 A1* | 11/2006 | Richter | G06Q 40/00 |
| | | | 705/35 |
| 2010/0054481 A1 | 3/2010 | Jajodia et al. | |
| 2010/0058456 A1 | 3/2010 | Jajodia et al. | |
| 2022/0070549 A1 | 3/2022 | Badaan et al. | |

OTHER PUBLICATIONS

Torgler, Benno: Big Data, Artificial Intelligence and Quantum Computing in Sports, Sep. 2020, Research Gate, pp. 1-24 (Year: 2020).*

The Barca Innovation Hub Team: Performance Analysis and Sports Technology: Monitoring Technologies for Sports Analysis, Jan. 24, 2020, pp. 1-4 (Year: 2020).*

Cao et al. :Blockchain-Enabled HMM Model for Sports Performance Prediction, Mar. 8, 2021, IEEE Access, vol. 8, 2021, pp. 40255-40262. (Year: 2021).*

* cited by examiner

| ROUND | POSITION | ISL PRICE |
| --- | --- | --- |
| FIRST | 1 | $10.00 |
| FIRST | 2 TO 10 | PRICE STARTS AT $9.80 AND THEN IS REDUCED BY 2% FOR EACH SUBSEQUENT POSITION |
| FIRST | 11 TO 32 | PRICE STARTS AT $8.25 AND THEN IS REDUCED BY 1% FOR EACH SUBSEQUENT POSITION |
| SECOND | 1 TO 32 | PRICE STARTS AT $6.68 AND THEN IS REDUCED BY 0.5% FOR EACH SUBSEQUENT POSITION |
| THIRDS | 1 TO 41 | PRICE STARTS AT $5.29 AND THEN IS REDUCED BY 0.25% FOR EACH SUBSEQUENT POSITION |
| FOURTH | 1 TO 39 | PRICE STARTS AT $3.93 AND THEN IS REDUCED BY 0.25% FOR EACH SUBSEQUENT POSITION |
| FIFTH | 1 TO 40 | PRICE STARTS AT $3.25 AND THEN IS REDUCED BY 0.25% FOR EACH SUBSEQUENT POSITION |
| SIXTH | 1 TO 44 | PRICE STARTS AT $2.94 AND THEN IS REDUCED BY 0.25% FOR EACH SUBSEQUENT POSITION |
| SEVENTH | 1 TO 31 | PRICE STARTS AT $2.64 AND THEN IS REDUCED BY 0.25% FOR EACH SUBSEQUENT POSITION |

FIG. 19

| PLAY TYPE | PLAY POINTS |
|---|---|
| PASSING YARD | 0.04 / YARD |
| RUSHING/RECEIVING YARD | 0.1 / YARD |
| RECEPTION | 1 |
| 10 COMPLETIONS | 1 |
| TD PASS | 4 |
| RUSH/REC TD | 6 |
| 40+ YARD TD | 1 |
| 50+ YARD TD | 2 |
| INTERCEPTION THROWN | -2 |
| FUMBLE LOST | -2 |
| 2PT CONV PASS | 1.5 |
| 2PT PASS RUSH/REC | 2 |
| 300-399 YARD GAME(PASS) | 3 |
| 400+ YARD GAME(PASS) | 2 |
| 100-199 YARD GAME(RUSH/REC) | 3 |
| 200+ YARD GAME(RUSH/REC) | 2 |

FIG. 20

| AWARDS / RECOGNITION | POINTS |
|---|---|
| MVP | 10 |
| OPOY | 7 |
| DPOY | 7 |
| OROY | 3 |
| DROY | 3 |
| MIP | 3 |
| AP 1 | 5 |
| AP 2 | 3 |
| PRO BOWL | 2 |
| NFL 100 - TOP 10 | 7 |
| NFL 100 - TOP 25 | 5 |
| NFL 100 - TOP 50 | 3 |
| NFL 100 - TOP 75 | 2 |
| NFL 100 - TOP 100 | 1 |
| NFL 100 - HONORABLE MENTION | 0.5 |

FIG. 21

| DEPTH CHART | POINTS |
|---|---|
| STARTER | 5 |
| 2ND STRING | 3 |
| 3RD | 2 |
| 4TH | 1 |

FIG. 22

| PLAYER'S POSITION | POINTS |
|---|---|
| QB, RB, ILB, MLB, TE | 3 |
| WR, S, CB, ER, OLB | 2 |
| OG, OT, C, DT, NT, DE | 1 |

FIG. 23

SYSTEM TO TRADE ATHLETES PERFORMANCE PROFILES AS STOCKS

CROSS-REFERENCE TO RELATED APPLICATIONS

This application claims the benefit of priority under 35 U.S.C § 119 of U.S. Provisional Application No. 63/203,491, filed on Jul. 25, 2021, which is hereby incorporated by reference in its entirety.

FIELD OF THE INVENTION

This invention relates to an online trading platform where professional and/or collegiate athletes' profiles are listed as stocks that buyers and sellers can trade. Instead of using a traditional demand and supply model, the platform will use a unique formula/algorithm to set the stock prices based on the profiles of athletes that are on the rosters of various sports leagues and associations including but not limited to National Football League (NFL), National Basketball Association (NBA), Major League Baseball (MLB), Major League Soccer (MLS), National Hockey League (NHL), international soccer/football, and National Collegiate Athletic Association (NCAA) sports.

BACKGROUND

"The sports share trading system and method provides a web site and on-line interface enabling users using real money to trade virtual shares of the careers of athletes in a closed market. Rookie sports cards are tokens representing the shares of stock in the athletes and are traded as financial instruments via the website. Users who buy cards, i.e., shares of stock, and keep them in the market are eligible for bonuses and guaranteed buybacks if they choose. A hall-of-fame guaranteed buy-back rewards users owning shares representing athletes who reach predetermined performance levels designated as "Hall of Fame Tiers". The buy-back offers are at a predetermined, published, guaranteed price, representing a conditionally guaranteed future value of all purchases. The self-contained trading platform web site is accessible by a variety of web-enabled devices." [U.S. Pat. No. 8,635,146, titled "Sports share trading system and method"]

"A distributed computer system is provided for collecting player information. Further, a scoring system is provided that rates a player based on one or more elements of the collected information. Players may be rated with respect to a number of characteristics. Responsive to a determined rating or score, action may be taken by the distributed system with regard to the player. For instance, the player may be provided a complimentary offer, provided an award, and invitation to come to a gambling location, presented an advertisement, or other action may be performed involving the player. Further, the distributed computer system may permit a player to manage their frequent player accounts and receive complimentary offers based on a set of criteria specified by the player." [U.S. Pat. No. 8,512,150, titled "System and method for collecting and using player information"]

"Sports fans and others can now watch sporting events, such as hockey games, basketball games, football games, baseball games, soccer games, automobile races, tennis matches, Olympic events, etc., on various devices, including televisions and, most recently, smartphones, tablets, and other mobile communication devices.

While this has greatly facilitated watching sporting events, individuals may have to actually watch sporting events, watch sports news, or access sports websites to view highlights of the sporting events. This may be impractical in many situations. For example, an individual may not have time to watch a sporting event and may only be able to watch highlights of that sporting event much later when he/she watches sports news or accesses a sports website." [U.S. Application Publication No. US20220070549A1, titled "Methods and systems for transmitting highlights of sporting events to communication devices"]

Therefore, there is a need for a system and a method, where sports enthusiasts and sports fans can trade or invest in the stock related to the sports players while the game is occurring and in real-time and may hold the shares or trade when the sports player reaches their peak performance, status, or price.

SUMMARY

An embodiment relates to a system comprising: a processor, a memory, and a database; wherein the database comprises a list of athletes; a historical performance of the athlete; a game schedule; and a data set comprising an athlete playing a game as per the game schedule; and the processor configured to: receive a real-time data along with a real-time performance of the athlete; determine a recommendation, using a machine learning model comprising artificial intelligence of a recommendation engine, to a user of a stock of the athlete for a future period; determine, a stock price associated with the stock of the athlete in real-time based on a computation metric comprising the real-time performance of the athlete in the game and the historical performance of the athlete, wherein the stock price of the athlete is computed using a blockchain technology; present to the user on a device comprising a graphical user interface, a listing of the athlete at the stock price, wherein the listing is dynamic based on at least one of the stock price, a play sequence of the athlete, a ranking of the athlete, statistics of the game, and a watchlist of the user; wherein the blockchain technology is configured to facilitate at least one of a creation of transaction of the stock, a recording of transaction of the stock, a verification of transaction of the stock, and a maintenance of transaction of the stock; wherein the blockchain technology is configured to maintain a profile of the athlete and statistics of an overall performance of the athlete in a blockchain environment; wherein the system is configured for trading the stock of the athlete based on the profile of the athlete on a trading platform; and wherein a cyber security module is configured for providing security to the system.

According to an embodiment of the system, the system is configured as an online trading platform to trade a share associated with the athlete.

According to an embodiment of the system, the processor is further configured to present the user with a trading opportunity at the stock price in real-time.

According to an embodiment of the system, the processor is further configured to record a trade performed on the stock in the database.

According to an embodiment of the system, an application program interface provides a real-time data stream of the game to the database.

According to an embodiment of the system, at an end of the game, the statistics of the game and the profile of the athlete are revised and appended as a new block in a blockchain.

According to an embodiment of the system, the system is configured for the user to trade the stock with one click.

According to an embodiment of the system, the system is configured to allow the user to access portfolio holding, cash value, and buying power through an account of the user.

According to an embodiment of the system, the system is configured for the user to trade the stock at the stock price in real-time as the game is in progress.

According to an embodiment of the system, the computation metric is implemented on blockchain technology to compute the stock price in real-time.

According to an embodiment of the system, the real-time data of the game and the athlete is obtained via a direct connection to a scoreboard of the game.

According to an embodiment of the system, the real-time data of the game and the real-time data of the athlete are obtained via a third-party organization.

According to an embodiment of the system, the system is configured to receive the historical performance of the athlete, the real-time performance of the athlete, and the overall performance of the athlete from a plurality of sources.

According to an embodiment of the system, the system is configured to determine a score of the athlete responsive to the real-time performance of the athlete based on information collected from the plurality of sources.

According to an embodiment of the system, the system is configured to collect and store data related to the overall performance of the athlete in a plurality of games and from a plurality of sources.

According to an embodiment of the system, the stock price is dependent on the ranking of the athlete.

According to an embodiment of the system, the stock price is further influenced by a depth chart translated into a value.

According to an embodiment of the system, the stock price is further influenced by a position of the athlete in the game.

According to an embodiment of the system, a sentiment analysis is performed on a material news to identify a popularity of the athlete.

According to an embodiment of the system, a sentiment analysis is performed on a material news to tag the material news as at least one of a positive news, a negative news, and a neutral news.

According to an embodiment of the system, an input to the machine learning model of the system comprises the profile of the athlete, a contextual data comprising a material news that affects at least one of a future game of the athlete and a sentiment of fans.

According to an embodiment of the system, a sentiment analysis is performed on the contextual data to analyze a popularity of the athlete.

According to an embodiment of the system, the computation metric further comprises a position of the athlete in the game.

According to an embodiment of the system, the computation metric further comprises a placement of the athlete on a depth chart.

According to an embodiment of the system, the machine learning model is configured to learn using labeled data using a supervised learning, wherein the supervised learning comprises logic using at least one of a decision tree, a logistic regression, a support vector machine, a k-nearest neighbors, a Naïve Bayes, a random forest, a linear regression, a polynomial regression, and a support vector machine for regression.

According to an embodiment of the system, the machine learning model is configured to learn from the real-time data of the game using an unsupervised learning, wherein the unsupervised learning comprises logic using at least one of a k-means clustering, a hierarchical clustering, a hidden Markov model, and an apriori algorithm.

According to an embodiment of the system, the machine learning model has a feedback loop, wherein an output from a previous step is fed back to the machine learning model in real-time to improve accuracy of the output of a next step from the machine learning model.

According to an embodiment of the system, the machine learning model comprises a recurrent neural network model.

According to an embodiment of the system, the machine learning model has a feedback loop, wherein learning is further reinforced with a reward for each true positive of an output of the system.

According to an embodiment of the system, the cyber security module further comprises an information security management module configured for providing isolation between the system and a server. According to an embodiment of the system, the information security management module is operable to: receive data from at least one of the graphical user interface, a financial interface, profile of the user, statistics of the athlete, statistics of the game, and the database; exchange a security key at a start of a communication between a communication module and the server; receive the security key from the server; authenticate an identity of the server by verifying the security key; analyze the security key for a potential cyber security threat; negotiate an encryption key between the communication module and the server; encrypt the data; and transmit the encrypted data to the server when no cyber security threat is detected. According to an embodiment of the system, the information security management module is operable to: exchange a security key at a start of a communication between a communication module and the server; receive the security key from the server; authenticate an identity of the server by verifying the security key; analyze the security key for a potential cyber security threat; negotiate an encryption key between the system and the server; receive encrypted data from the server; decrypt the encrypted data; perform an integrity check of the decrypted data; and transmit the decrypted data to at least one of the graphical user interface, a financial interface, profile of the user, statistics of the athlete, statistics of the game, and the database through the communication module when no cyber security threat is detected. According to an embodiment of the system, the information security management module is configured to raise an alarm when a cyber security threat is detected. According to an embodiment of the system, the information security management module is configured to discard the encrypted data received if an integrity check of the encrypted data fails. According to an embodiment of the system, the information security management module is configured to check integrity of the encrypted data by checking accuracy, consistency, and any possible data loss during the communication through the communication module. According to an embodiment of the system, the information security management module is configured to perform asynchronous authentication and validation of a communication between a communication module and the server. According to an embodiment of the system, a perimeter network provides an extra layer of protection. According to an embodiment of the system, the perimeter network protects the system from a cyber security threat by using a plurality of firewalls. An embodiment relates to a method comprising: receiving a real-time data of a game along with a real-time performance of an athlete; determining a recommendation, using a machine learning model comprising artificial intelligence of a recommendation engine, to a user of a stock of the athlete for a future period; determining, a stock price associated with the stock of the athlete in real-time based on a computation metric comprising the real-time performance of the athlete in the game and a historical performance of the athlete, wherein the stock price of the athlete is computed using a blockchain technology; presenting to the user on a device comprising a graphical user interface, a listing of the athlete at the stock price, wherein the listing is dynamic based on at least one of the stock price, a play sequence of the athlete, a ranking of the athlete, statistics of the game, and a watchlist of the user; wherein the blockchain technology is configured to facilitate at least one of a creation of transaction of the stock, a recording of transaction of the stock, a verification of transaction of the stock, and a maintenance of transaction of the stock; wherein the blockchain technology is configured to maintain a profile of the athlete and statistics of an overall performance of the athlete in a blockchain environment; wherein the method is configured for trading the stock of the athlete based on the profile of the athlete on a trading platform; and wherein a cyber security module is configured for providing security of a process and data on the trading platform. An embodiment relates to a non-transitory computer-readable medium having stored thereon instructions executable by a computer system to perform operations comprising: receiving a real-time data of a game along with a real-time performance of an athlete; determining a recommendation, using a machine learning model comprising artificial intelligence of a recommendation engine, to a user of a stock of the athlete for a future period; determining, a stock price associated with the stock of the athlete in real-time based on a computation metric comprising the real-time performance of the athlete in the game and a historical performance of the athlete, wherein the stock price of the athlete is computed using a blockchain technology; presenting to the user on a device comprising a graphical user interface, a listing of the athlete at the stock price, wherein the listing is dynamic based on at least one of the stock price, a play sequence of the athlete, a ranking of the athlete, statistics of the game, and a watchlist of the user; wherein the blockchain technology is configured to facilitate at least one of a creation of transaction of the stock, a recording of transaction of the stock, a verification of transaction of the stock, and a maintenance of transaction of the stock; wherein the blockchain technology is configured to maintain a profile of the athlete and statistics of an overall performance of the athlete in a blockchain environment; wherein the instructions executable by the computer system are configured for trading the stock of the athlete based on the profile of the athlete on a trading platform; and wherein a cyber security module is configured for providing security of a process and data on the trading platform. An embodiment relates to a method comprising: processing information regarding a game at a computing apparatus to determine that a highlight of the game is to be conveyed to a mobile communication device; transmitting data regarding the highlight of the game to the mobile communication device over a wireless network during the game; determining a recommendation, using a machine learning model comprising artificial intelligence of a recommendation engine, to a user of a stock of an athlete for a future period; determining a stock price associated the stock of the athlete in real-time based on a computation metric comprising a real-time performance of the athlete in the game and a historical performance of the athlete, wherein the stock price of the athlete is computed using a blockchain technology; causing the mobile communication device to present an option for the user to trade a stock at the stock price relating to the athlete of the game; and transmitting data to the mobile communication device over the wireless network to allow the user to trade the stock of the athlete of the game on the mobile communication device; and wherein the method is configured to be executed on the mobile communication device to view a part of the game and trade the stock in real-time relating to the athlete while the game is occurring.

BRIEF DESCRIPTION OF THE FIGURES

In the present disclosure, reference is made to the accompanying drawings, which form a part hereof. In the drawings, similar symbols typically identify similar components, unless context dictates otherwise. Various embodiments described in the detailed description, drawings, and claims are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein.

FIG. 19 shows the Initial Stock Listing (ISL) prices for athletes drafted during the draft based on the draft round and position according to an embodiment.

FIG. 20 shows the Play Points that are calculated per play for each athlete involved in the play according to an embodiment.

FIG. 21 shows the past performance points allocated for an athlete involved in the play according to an embodiment.

FIG. 22 shows the spot on depth chart that is translated into a value according to an embodiment.

FIG. 23 shows the athlete's position translated into a value according to an embodiment.

DETAILED DESCRIPTION

Definitions and General Techniques

Figure 1:
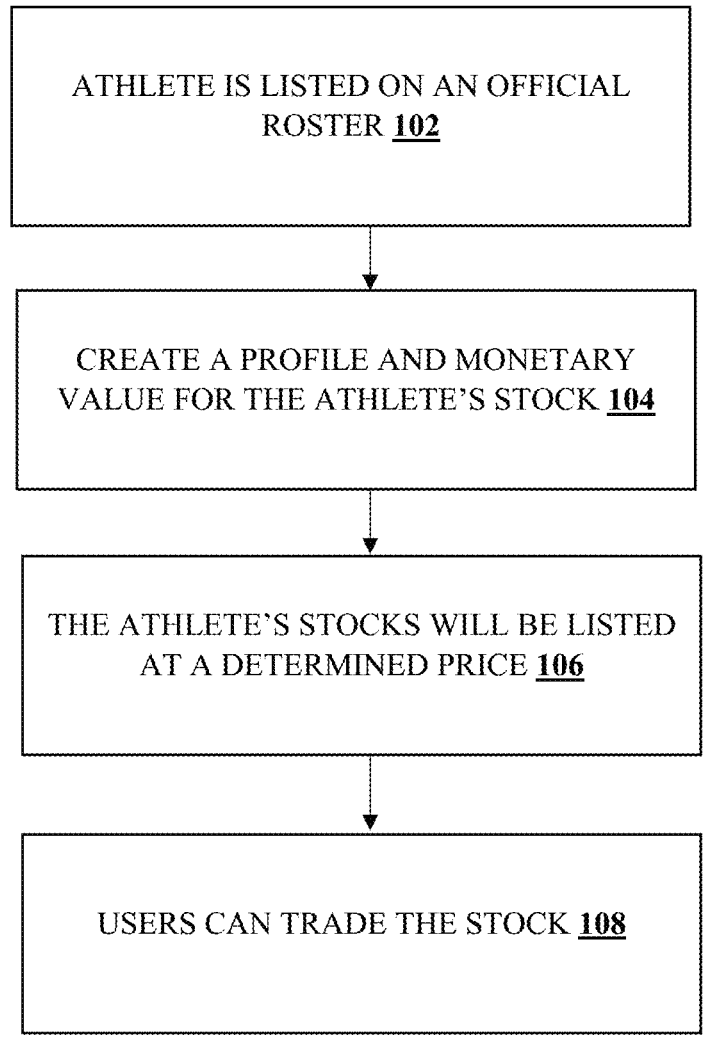
FIG. 1 shows the flow of the system where an athlete's profile is converted into a stock to be listed on our trading platform according to an embodiment.

The following terms and phrases, unless otherwise indicated, shall be understood to have the following meanings.

For simplicity and clarity of illustration, the drawing figures illustrate the general manner of construction. Descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same elements.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only and is not intended to be limiting. Unless defined otherwise, all technical and scientific terms used herein have the same meaning as commonly understood by one with ordinary skill in the art to which this disclosure belongs.

The articles "a" and "an" are used herein to refer to one or to more than one (i.e., to at least one) of the grammatical object of the article. By way of example, "an element" means one element or more than one element.

The terms "first", "second", "third", and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include", "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

No element act, or instruction used herein should be construed as critical or essential unless explicitly described as such. Furthermore, as used herein, the term "set" is intended to include items (e.g., related items, unrelated items, a combination of related items and unrelated items, etc.), and may be used interchangeably with "one or more". Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

It should be understood that the terms "system," "device," "unit," and/or "module" are used in this disclosure to refer to a different component, component, portion, or component of the different levels of the order. However, if other expressions achieve the same purpose, these terms may be replaced by other expressions.

The terms, "couple", "coupled", "couples", "coupling", and the like should be broadly understood and refer to as connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably", "removable", and the like near the word "coupled", and the like does not mean that the coupling, etc. in question is or is not removable.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

As defined herein, "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to a suitable receiver apparatus.

The actual specialized control hardware or software code used to implement these systems and/or methods is not limiting of the implementations. Thus, the operation and behavior of the systems and/or methods described herein without reference to specific software code, it being understood that any software and any hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer will also include, or be operatively coupled to receive data, transfer data or both, to/from one or more mass storage devices for storing data e.g., magnetic disks, magneto optical disks, optical disks, or solid-state disks. However, a computer need not have such devices. Moreover, a computer may be embedded in another device, e.g., a mobile telephone, a personal digital assistant (PDA), a mobile audio athlete, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD)

monitor, for displaying information to the user, and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a Local Area Network (LAN) and a Wide Area Network (WAN), e.g., Intranet and Internet.

The computing system may include clients and servers. A client and server are generally remote from each other and typically interact through a communication network. The relationship of the client and server arises by virtue of computer programs running on the respective computers and having a client-server relationship with each other.

Embodiments of the present invention may comprise or utilize a special purpose or general purpose computer including computer hardware. Embodiments within the scope of the present invention may also include physical and other computer-readable media for carrying or storing computer-executable instructions and/or data structures. Such computer-readable media can be any media that can be accessed by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

Physical computer-readable storage media includes random access memory (RAM), read only memory (ROM), electrically erasable programmable read-only memory (EEPROM), compact disc read only memory (CD-ROM) or other optical disk storage (such as compact disc (CD), digital versatile disc (DVD), etc.), magnetic disk storage or other magnetic storage devices, solid-state disks or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures, and which can be accessed by a general purpose or special purpose computer. Combinations of the above, that enable the transport of electronic data between computer systems and/or modules and/or other electronic devices, are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (NIC), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter has been described in language specific to structural features and/or methodological acts, it is to be understood that the subject matter defined in the claims is not necessarily limited to the described features or acts described. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments.

The disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As used herein, the term "SQL" stands for Structured Query Language. It is a language used in programming and designed for managing data held in a Relational Database Management System (RDBMS), or for stream processing in a Relational Data Stream Management System (RDSMS). It is particularly useful in handling structured data i.e., data incorporating relations among entities and variables.

As used herein, the term "API" stands for Application Programming Interface. It is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modularity, allowing users to use the interface independently of the implementation. Web APIs are now the most common meaning of the term API. There are also APIs for programming languages, software libraries, computer operating systems, and computer hardware.

The APIs may be dynamically derived by the network. In other implementations, the APIs may be derived from API records that are stored by the network. Additionally, when new APIs are derived for a particular network service, the APIs may be recorded in case a similar network service request (e.g., from another user) is received, in which case the record may be promptly used to determine the appropriate API, or set of APIs, for the requested network service.

The API request (e.g., for a name, an ID, or another type of information in the request) may correspond to network interactions, communications, events, etc., that are to occur in order to provide the network service. The chain of network interactions, communications, events, etc., may be stored in libraries/repositories of the Software Defined Networking (SDN). APIs may be derived based on the characteristics of each of the interactions, communications, events, etc., being mapped to characteristics of APIs (also stored in libraries/repositories of the SDN architecture).

As used herein, the term "Logging" is the process of collecting and storing data over a period in order to analyze specific trends or record the data-based events/actions of a system, network, or Information Technology (IT) environment. It enables the tracking of all interactions through which data, files or applications are stored, accessed, or modified on a storage device or application.

As used herein, the term "Batch processing" is the processing of transactions in a group or batch. No user interaction is required once batch processing is underway.

As used herein, the term "Unauthorized access" is when someone gains access to a website, program, server, service, or other system using someone else's account or other methods. For example, if someone kept guessing a password or username for an account that was not theirs until they gained access, it is considered unauthorized access.

As used herein, the term "Data maintenance" is the process of organizing and curating data. Properly maintaining and caring for data is essential to ensuring that data remains accessible and usable for its intended purposes.

As used herein, the term "IoT" stands for Internet of Things which describes the network of physical objects "things" or objects that are embedded with sensors, software, and other technologies for the purpose of connecting and exchanging data with other devices and systems over the internet.

As used herein, the term "Data mining" is a process used to turn raw data into useful information.

As used herein, the term "Data acquisition" is the process of sampling signals that measure real world physical conditions and converting the resulting samples into digital numeric values that can be manipulated by a computer. Data acquisition systems typically convert analog waveforms into digital values for processing. The components of data acquisition systems include sensors to convert physical parameters to electrical signals, signal conditioning circuitry to convert sensor signals into a form that can be converted to digital values, and analog-to-digital converters to convert conditioned sensor signals to digital values. Stand-alone data acquisition systems are often called data loggers.

As used herein, the term "Dashboard" is a type of interface that visualizes particular Key Performance Indicators (KPIs) for a specific goal or process. It is based on data visualization and infographics.

As used herein, a "Database" is a collection of information that is organized so that it can be easily accessed, managed, and updated. Computer databases typically contain aggregations of data records or files.

As used herein, the term "Data warehouse" also known as an Enterprise Data Warehouse (EDW) is a repository of integrated data from one or more disparate sources.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, a "Sensor" is a device that measures physical input from its environment and converts it into data that can be interpreted by either a human or a machine. Most sensors are electronic (the data is converted into electronic data), but some are simpler, such as a glass thermometer, which presents visual data.

The term "game" as used herein refers to a physical, a mental activity, or a contest that has rules and that people or athletes do for pleasure. A sport is a contest or game in which people do certain physical activities according to a specific set of rules and compete against each other. A game is any mental or physical activity with rules that is done for fun, such as physical activities like baseball and soccer, or board games such as chess and Monopoly, or card games, or electronic games (like apps), or video games. Sports are specific physical activities one can compete in such as baseball, soccer, football, field hockey, running, cycling, rock climbing, swimming, diving, race car driving, kayaking, or weightlifting. The terms game and sport are used interchangeably and mean any activity which involves athletes. It can include both team sports and individual sports. The term game has been used to mean a sport (as in basketball, baseball etc.) and also a specific instance of a match (as in 'a future game').

The term 'match' as used herein, in relation to sports, refers to a specific instance of a game. It is a contest in which people or teams compete against each other in a particular sport.

The term "sports league" or "league" as used herein refers to a group of sports teams or individual athletes that compete against each other and gain points in a specific sport.

The term "season" as used herein in relation to sports refers to a portion of one year in which regulated games of the sport are in session as that of an organized sports league: for example, in Major League Baseball the season lasts approximately from the last week of March to the last week of September. In other team sports, like association football or basketball, it is generally from August or September to May although in some countries, such as Northern Europe or East Asia, the season starts in the spring and finishes in autumn, mainly due to weather conditions encountered during the winter. A year can often be broken up into several distinct sections (sometimes called seasons). These are: a preseason, a series of exhibition games played for training purposes; a regular season, the main period of the league's competition; the postseason, a playoff tournament played against the league's top teams to determine the league's champion; and the offseason, the time when there is no official competition.

The term "game schedule" as used herein refers to a timetable of games. For example, a schedule of league games organized by the league operator.

The term "depth chart" as used herein, in reference to sports, is primarily used to show the placements of the starting athletes and the secondary athletes. Generally, a starting athlete will be listed first or on top while a back-up will be listed below. Depth charts also tend to resemble the actual position locations of certain athletes.

The term "material news" as used herein refers to news that might affect the value of its securities or influence users (investors) decisions. It is any type of news that directly relates to the athletes and the game, and depending on the news, it will move the athletes share price up or down.

The term "stock" also known as equity, as used herein here refers to the rights and/or value to players profile which allows the investors to benefit as players' profile improves with better performance. Units of stock are called "shares" which can be traded as per the real-time value of the share. It may also be referred to as StockLete.

The term "stock price" as used herein refers to the most recent selling price of a stock that is traded on the trading platform and is the most reliable indicator of that athlete's present value on the trading platform.

The term "trade" as used herein refers to transfer of goods and services from one person or entity to another, often in exchange for money. Stock trading refers to the buying and selling of shares.

The term "trading opportunity" as used herein refers to a specific trading offer on stock share/s based on buy price, sell price, target, and stop loss.

The term "polarity" as used herein refers to breaking up into opposing factions or groupings. Sentiment polarity for an element defines the orientation of the expressed sentiment, i.e., it determines if the text expresses the positive, negative, or neutral sentiment of the user about the entity in consideration.

The term "network" or "a cloud system" or "cloud computing technology" refers to the computing components including hardware, software and infrastructure that enable cloud computing.

The term "athlete" as used herein refers to a person who is involved in sports and may be taking part in a game or a match. The term may also be referred to as a player or sports person.

The term "user" as used herein refers to a person or entity who is using or trading on the trading platform.

The term "watchlist" as used herein refers to a list of athletes that a user watches with an eye towards taking advantage of varying stock price.

The term "true positive" as used herein is an outcome where a model correctly predicts the positive class. Similarly, a true negative is an outcome where the model correctly predicts the negative class. A false positive is an outcome where the model incorrectly predicts the positive class.

The term "blockchain" as used herein refers to a digital ledger to store transactional information. The data is stored as signed blocks, which link to each other, creating a chain of immutable interconnected data entries. It is a decentralized linked data structure that is characterized by its inherent resistance to data modification.

The term "blockchain technology" as used herein refers to a technology which makes the history of any digital asset unalterable and transparent through the use of a decentralized network and cryptographic hashing, it is also sometimes referred to as distributed ledger technology (DLT).

The term "blockchain environment" as used herein refers to an environment where a blockchain technology is deployed. It is also referred to as a blockchain system or a blockchain network comprising the components of node, ledger, wallet, nonce and hash.

The term "historical performance", as used herein, in relation to an athlete, refers to the athlete's performance in the past, including but not limited to athletes' awards, past achievement, peak performance metrics, low performance metrics, wins, losses, etc.

The term "real-time performance", as used herein, in relation to an athlete, refers to the athlete's performance in the current or ongoing game which is captured in real-time.

The term "overall performance", as used herein, in relation to an athlete, refers to the athlete's performance in the current or ongoing game which is captured in real-time and historical performance which may be consolidated to form overall statistics on the athlete's performance.

As used herein "Machine learning (ML)" refers to algorithms that give a computer the ability to learn without being explicitly programmed, including algorithms that learn from and make predictions about data. Machine learning algorithms include, but are not limited to, decision tree learning, artificial neural networks (ANN) (also referred to herein as a "neural net"), deep learning neural network, support vector machines, rules-based machine learning, random forest, etc. For the purposes of clarity, algorithms such as linear regression or logistic regression can also be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may be featured with a feedback loop to adjust the system output dynamically as it learns from the new data as it becomes available. In machine learning, backpropagation and feedback loops are used to train the AI/ML model improving the model's accuracy and performance over time.

The term "sentiment analysis", also referred to as opinion mining or emotion AI, as used herein refers to the use of natural language processing, text analysis, computational linguistics, and biometrics to systematically identify, extract, quantify, and study affective states and subjective information. Sentiment analysis may be widely applied to a voice of the customer regarding review materials, such as reviews and survey responses, online and social media, and regarding healthcare materials for applications that range from marketing to customer service to clinical medicine. With the use of deep language models, such as RoBERTa, more difficult data domains can be analyzed, e.g., news texts where authors typically express their opinion/sentiment less explicitly. There are various types of sentiment analysis, for example, Aspect Based sentiment analysis, Grading sentiment analysis (positive, negative, neutral), Multilingual sentiment analysis and detection of emotions.

The term "apriori algorithm" as used herein refers to an algorithm for frequent item set mining and association rule learning over relational databases. It proceeds by identifying the frequent individual items in the database and extending them to larger and larger item sets as long as those item sets appear sufficiently often in the database. The frequent item sets determined by apriori algorithm can be used to determine association rules which highlight general trends in the database.

The term "cyber security" as used herein refers to application of technologies, processes, and controls to protect systems, networks, programs, devices, and data from cyber-attacks.

The term "cyber security module" as used herein refers to a module comprising application of technologies, processes, and controls to protect systems, networks, programs, devices and data from cyber-attacks and threats. It aims to reduce the risk of cyber-attacks and protect against the unauthorized exploitation of systems, networks, and technologies. It includes, but is not limited to, critical infrastructure security, application security, network security, cloud security, Internet of Things (IoT) security.

The term "encrypt" used herein refers to securing digital data using one or more mathematical techniques, along with a password or "key" used to decrypt the information. It refers to converting information or data into a code, especially to prevent unauthorized access. It may also refer to concealing information or data by converting it into a code. It may also be referred to as cipher, code, encipher, encode. A simple example is representing alphabets with numbers—say, 'A' is '01', 'B' is '02', and so on. For example, a message like "HELLO" will be encrypted as "0805121215," and this value will be transmitted over the network to the recipient(s).

The term "decrypt" used herein refers to the process of converting an encrypted message back to its original format. It is generally a reverse process of encryption. It decodes the encrypted information so that only an authorized user can decrypt the data because decryption requires a secret key or password. This term could be used to describe a method of unencrypting the data manually or unencrypting the data using the proper codes or keys.

The term "cyber security threat" used herein refers to any possible malicious attack that seeks to unlawfully access data, disrupt digital operations, or damage information. A malicious act includes but is not limited to damaging data, stealing data, or disrupting digital life in general. Cyber threats include, but are not limited to, malware, spyware, phishing attacks, ransomware, zero-day exploits, trojans, advanced persistent threats, wiper attacks, data manipulation, data destruction, rogue software, malvertising, unpatched software, computer viruses, man-in-the-middle attacks, data breaches, Denial of Service (DoS) attacks, and other attack vectors.

The term "hash value" used herein can be thought of as fingerprints for files. The contents of a file are processed through a cryptographic algorithm, and a unique numerical value—the hash value—is produced that identifies the contents of the file. If the contents are modified in any way, the value of the hash will also change significantly. Example algorithms used to produce hash values: the Message Digest-5 (MD5) algorithm and Secure Hash Algorithm-1 (SHA1).

The term "integrity check" as used herein refers to the checking for accuracy and consistency of system related files, data, etc. It may be performed using checking tools that can detect whether any critical system files have been changed, thus enabling the system administrator to look for unauthorized alteration of the system. For example, data integrity corresponds to the quality of data in the databases and to the level by which users examine data quality, integrity, and reliability. Data integrity checks verify that the data in the database is accurate, uncompromised, and functions as expected within a given application. Data integrity refers to the accuracy and consistency (validity) of data over its lifecycle.

The term "alarm" as used herein refers to a trigger when a component in a system fails or the system fails or does not perform as expected. The system may enter an alarm state when a certain event occurs. An alarm indication signal is a visual signal to indicate the alarm state. For example, if a user's heart rate is very low, a light emitting diode (LED) may glow red alerting that the user's heart rate is beyond the specified limits, and the LED may turn green when the heart rate is within specified limits. Another example could be when a cyber security threat is detected, a network administrator may be alerted via a sound alarm, a message, a glowing LED, a pop-up window, etc. An alarm indication signal may be reported downstream from a detecting device to prevent adverse situations or cascading effects.

The term "in communication with" as used herein, refers to any coupling, connection, or interaction using electrical signals to exchange information or data, using any system, hardware, software, protocol, or format, regardless of whether the exchange occurs wirelessly or over a wired connection.

As used herein, the term "cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation, secret sharing, and secure multi-party computations. Hashing algorithms may be used to verify the integrity of data. Secure Socket Layer (SSL) and Transport Layer Security (TLS), the successor to SSL, are cryptographic protocols that may be used by networking switches to secure data communications over a network.

As used herein, the term "perimeter network" refers to a network closest to a router that is not under the enterprise or organization control. Usually, a perimeter network is the final step a packet takes traversing one of your networks on its way to the internet; and conversely the first network encountered by incoming traffic from the Internet. A network perimeter is a secured boundary between the private and locally managed side of a network, often a company's intranet, and the public facing side of a network, often the Internet. The boundary is defined as a perimeter network.

As used herein, the term "network" may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers. Cloud servers are located in data centers all over the world. By using cloud computing, users and companies do not have to manage physical servers themselves or run software applications on their own machines.

As used herein, the term "system hardening" is a collection of tools, techniques, and best practices to reduce vulnerability in technology applications, systems, infrastructure, firmware, and other areas. The goal of system hardening may be to reduce security risk by eliminating potential attack vectors and condensing the system's attack surface.

As used herein, the term "SHA256" stands for Secure Hash Algorithm 256-bit is a hash function and it is used for cryptographic security. Cryptographic hash algorithms produce irreversible and unique hashes. The larger the number of possible hashes, the smaller the chance that two values will create the same hash.

As of now, sports fans and enthusiasts have no online platform to capitalize on and monetize their analytical skills and knowledge about the athletes they follow closely. There are a few betting platforms, but they are meant for short-lived gambling bets. None of these platforms are investing platforms where you are able to invest in an athlete's profile as a stock and hold until it appreciates in value as the athlete matures and reaches their estimated or calculated peak of their career.

Embodiments relate to an online trading platform where professional and collegiate athletes' profiles are listed as shares that buyers and sellers can trade. Instead of using the traditional demand and supply model, the online trading platform will set the stock prices based on athletes' profiles that are on the rosters of various sports leagues and associations including NFL, NBA, MLB, MLS, NHL, international soccer/football, and NCAA sports. The stock price of the athletes' profiles will be calculated live, in real-time, during the athlete's game, for the traders to trade online. The stock price can also change if there is any material news about an athlete that significantly affects their future performance. All the athletes will have the same fixed number of outstanding shares on the trading platform; however, each league will have a unique scoring formula that will determine the value of the stock.

Trading platform of the system: According to an embodiment, the trading platform allows a sports enthusiast to trade and invest on an athlete's profile as a stock.

FIG. 1 shows the flow of the system where an athlete's profile is converted into a stock to be listed on our trading platform according to an embodiment. At step 102, an athlete or an athlete is listed on an official roster. The athlete may be part of a team or of a club in a league or may be participating as an individual. The official roster, according to an embodiment, may be a digital roster that is created and maintained in a database. In an embodiment, athletes can be listed or registered by the platform administration and intimated by a digital communication means of their registration for confirmation from the athletes. In an embodiment, a sports authority can register all the athletes associated with them or athletes of the team associated with them. In another embodiment, an athlete can register himself on the platform. A database is formed from all the athletes, sports and the games that may be happening in a year or in a place of interest. At step 104, the system will create a profile of the athlete and determine a monetary value for the athlete's stock. The system, according to an embodiment, may be using machine learning algorithms aided by artificial intelligence (AI) to determine a stock price. The stock price is dynamically determined for each athlete. The determination of the stock price associated with an athlete is performed by AI in real-time and is based on a computation metric comprising real-time performance of the athlete in the game, the historical performance of the athlete, and a material news that affects at least one of a future game and sentiment of fans, wherein the stock price of the athlete is computed using a blockchain technology. The quantity of the stock price of an athlete is also determined on the athlete's demand from the fan base. At step 106, the athlete's stock price will be listed on the trading platform of the system for a determined price. At step 108, users can access the stock shares of athletes on their personal devices, for example a mobile, a computer, etc. Users can trade the stock, as in buy, sell on the system's trading platform with an intuitive graphical user interface (GUI).

In an embodiment, icons on a graphical user interface (GUI) display on the user's device are re-arranged based on a dynamic stock price and a ranking of the athlete while the game is progressing. All the athletes relating to a match, or a league are all shown in the watchlist. In an embodiment, the watchlist can be according to the preferred settings of the user. The processor tracks the stock price of all the athletes in the game and displays them dynamically according to the stock price. For example, in a league of National Basketball Association, if LeBron James, based on performance in the real-time game, has the highest stock price he will be listed on the top in the game watchlist and then the next ranking person, and so on. As the game progresses, the athletes dynamically take places on the ranking board or leadership board. In an embodiment, the GUI further will list other trades on the athlete that are happening, for example, on trading cards, collectibles, other sports stocks, etc., for the athlete. In an embodiment, it also lists all the athlete statistics, highlights, seasons high, low performances, on the GUI. While trading when the stock prices shoot up or down, a portion of the GUI is dedicated to providing a highlight of the reason, either as a video clip or a message. As the game progresses, the trader/user can see in real-time the up and down movement of the stock prices associated with the athlete and can decide whether to trade dynamically or to invest and hold on to the stock. In an embodiment, the platform enables users to buy and sell derivative equity in an athlete. The platform will be active all through the year and all through the seasons. It may be used daily or on a seasonal basis.

In an embodiment, a method allows a user of a mobile communication device to view a part of a sporting event while the sporting event is occurring, the method comprising: processing information regarding a plurality of sporting events in a computing apparatus to determine that a highlight of the sporting event is to be conveyed to the mobile communication device; transmitting data regarding the highlight of the sporting event to the mobile communication device over a wireless network during the sporting event; causing the mobile communication device to present an option for the user to trade a stock relating to an athlete of the sporting event after the highlight of the sporting event; and transmitting data to the mobile communication device over the wireless network to allow the user to trade a stock relating to an athlete of the sporting event on the mobile communication device.

Figure 2A:
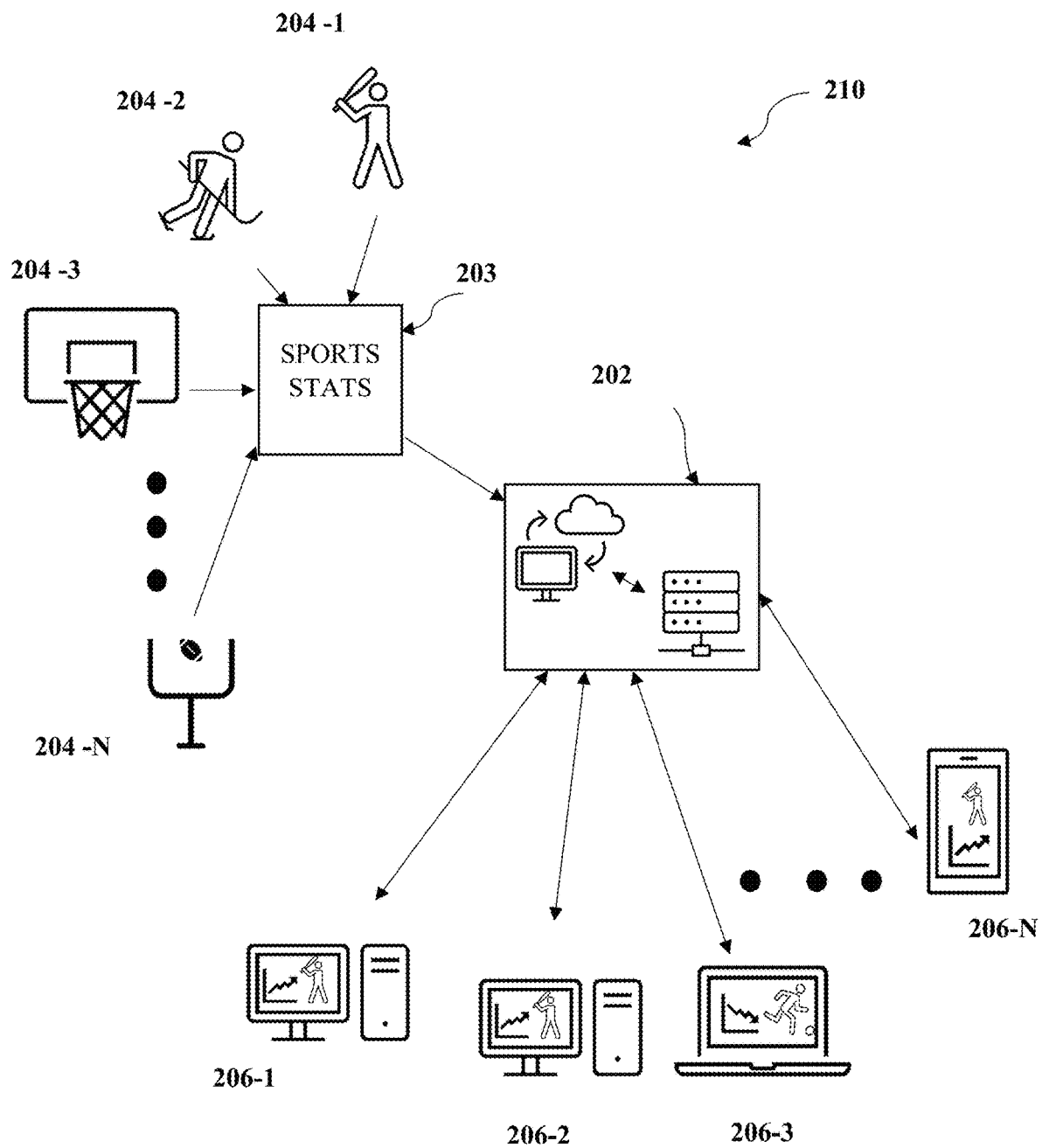
FIG. 2A shows the trading platform of the system where the sport statistics are received from a third party according to an embodiment.

FIG. 2A shows the trading platform of system 210 where the sport statistics are received from a third party according to an embodiment. According to FIG. 2A, trading platform 202 comprises a network (a cloud system) and a database. The trading platform receives sports statistics (sports stats) 203 from a third party. The third party may be connected directly through a communication network that receives the real-time data as the game is progressing from the sports arenas, sports fields, or sports scoring boards. In an embodiment, the trading platform of the system is enabled for receiving data from various sports as shown in 204-1, 204-2, 204-3, . . . 204-N. The trading environment, where the user is enabled to buy, sell, or invest in the trades based on athletes' performance is enabled on various user devices 206-1, 206-2, 206-3, . . . 206-N. These devices may be computers, laptops, cell phones or mobile phones, etc. According to an embodiment of the system, the real-time data of the game and the real-time data of the athlete are obtained via a third-party organization.

An embodiment relates to a system comprising: a processor, a memory, and a database; wherein the database comprises a list of athletes; a historical performance of the athlete; a game schedule; and a data set comprising an athlete playing a game as per the game schedule; and the processor configured to: receive a real-time data along with a real-time performance of the athlete; determine a recommendation, using a machine learning model comprising artificial intelligence of a recommendation engine, to a user of a stock of the athlete for a future period; determine, a stock price associated with the stock of the athlete in real-time based on a computation metric comprising the real-time performance of the athlete in the game and the historical performance of the athlete, wherein the stock price of the athlete is computed using a blockchain technology; present to the user on a device comprising a graphical user interface, a listing of the athlete at the stock price, wherein the listing is dynamic based on at least one of the stock price, a play sequence of the athlete, a ranking of the athlete, statistics of the game, and a watchlist of the user; wherein the blockchain technology is configured to facilitate at least one of a creation of transaction of the stock, a recording of transaction of the stock, a verification of transaction of the stock, and a maintenance of transaction of the stock; wherein the blockchain technology is configured to maintain a profile of the athlete and statistics of an overall performance of the athlete in a blockchain environment; wherein the system is configured for trading the stock of the athlete based on the profile of the athlete on a trading platform; and wherein a cyber security module is configured for providing security to the system.

According to an embodiment of the system, the system is configured as an online trading platform to trade a share associated with the athlete. According to an embodiment of the system, the processor is further configured to present the user with a trading opportunity at the stock price in real-time. According to an embodiment of the system, the processor is further configured to record a trade performed on the stock in the database. According to an embodiment of the system, an application program interface provides a real-time data stream of the game to the database.

According to an embodiment of the system, the computation metric further comprises a position of the athlete in the game. According to an embodiment of the system, the computation metric further comprises a placement of the athlete on a depth chart.

According to an embodiment of the system, the system is configured to receive the historical performance of the athlete, the real-time performance of the athlete, and the overall performance of the athlete from a plurality of sources. According to an embodiment of the system, the system is configured to determine a score of the athlete responsive to the real-time performance of the athlete based on information collected from the plurality of sources. According to an embodiment of the system, the system is configured to collect and store data related to the overall performance of the athlete in a plurality of games and from a plurality of sources.

Figure 2B:
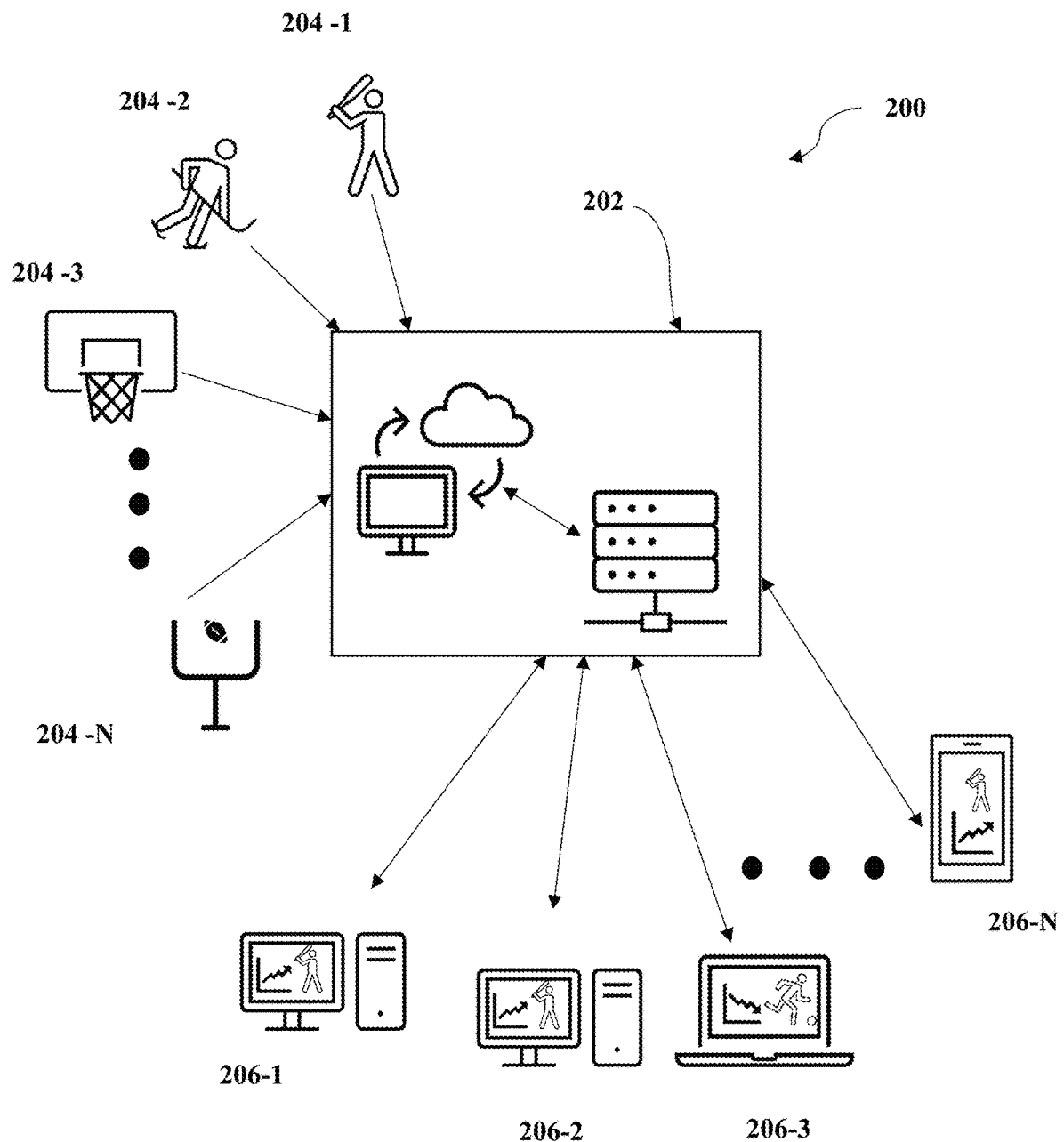
FIG. 2B shows the trading platform of the system where the sport statistics are received directly from the sports events according to an embodiment.

FIG. 2B shows the trading platform of the system where the sport statistics are received directly from the sports events according to an embodiment. According to FIG. 2B the trading platform 202 comprises a network (a cloud system) and a database. The trading platform receives sports statistics (sports stats) by connecting directly, through a communication network, and receiving the real-time data as the game is progressing from the sports arenas, sports fields, or sports scoring boards. In an embodiment, the trading platform of the system is enabled for receiving data for various sports as shown in 204-1, 204-2, 204-3, . . . 204-N. The trading environment, where the user is enabled to buy, sell, or invest in the trades based on athletes' performance is enabled on various user devices 206-1, 206-2, 206-3, . . . 206-N. These devices may be computers, laptops, cell phones or mobile phones etc. According to an embodiment of the system, the real-time data of the game and the athlete is obtained via a direct connection to a scoreboard of the game.

In an embodiment, the trading platform 202, is an online trading platform, and may be deployed on mobile devices for sports enthusiasts and fans to trade the stocks while they are at the game or watching at home live. The mobile apps are user-friendly and are the best-in-class consumer apps developed for Operating System (OS), for example, an iPhone Operating System (iOS) and for Android® devices.

In an embodiment, the trading platform 202 comprises machine learning models aided by artificial intelligence and blockchain technology through which a stock price is computed for an athlete's stock based on athlete's real-time performance, athlete's historic performance, and any material news related to the athlete. The stock price is computed in the blockchain environment and the ledger of the stock transaction record of the stock associated with the athlete is stored in a blockchain environment.

Implementation of Artificial Intelligence for Athlete Statistics: The AI driven engine will provide all the statistics and predictions about the athletes and their upcoming games for the users to make decisions on whether to buy, sell or hold stocks. A proprietary valuation engine will calculate a value for each athlete based on multiple factors. These factors may comprise in-game statistics, importance to their team (role, age/experience), and season awards and achievements. This will serve as the athlete's stock value, which will be tradable. Any changes to the above information will affect the stock value and will thus increase or decrease according to the algorithm.

A natural language processing engine with ML/AI will analyze and perform sentiment analysis on all the news stories relating to every single athlete whose stock is traded on this platform. Using natural language processing, the system will analyze news stories and perform entity extraction or athlete news extraction and sentiment analysis to tag the story as a positive or negative story on a particular athlete. This sentiment analysis will be provided to the users for consumption and used to analyze and trade stocks.

Sentiment analysis is used in classifying the polarity of a given text at the document, sentence, or feature/aspect level—whether the expressed opinion in a document, a sentence or an entity feature/aspect is positive, negative, or neutral. Advanced or beyond polarity sentiment classification looks, for instance, at emotional states such as enjoyment, anger, disgust, sadness, fear, and surprise. The data required for sentiment analysis is obtained, according to an embodiment, via the sensors associated with the computer, cell phone, wearable health devices, etc., for example, microphone, heart rate sensor, key pressure and touch pressure sensors. Touch pressure sensors, capture where the user highlights and dwells for a long time, cameras capture the image and analyze for an emotion while the user is reading a particular section, etc. For a given context, various sentiments or emotions of the user are ranked, based on the findings. The emotion states of multiple users are used in determining the stock price relating to an athlete in real-time. In an embodiment, subjectivity/objectivity identification is performed for classifying a given text, usually a sentence, into one of two classes: objective or subjective. The subjectivity of words and phrases may depend on their context and an objective document may contain subjective sentences (e.g., a news article quoting people's opinions).

In an embodiment, a recommendation system comprising sentiment analysis is used to predict the liking or following of a target user or a group of users. Recommender systems may work on explicit data sets. For example, collaborative filtering works on the rating matrix, and content-based filtering works on the meta-data of the athlete.

In many social networking services, users can provide opinions, comments, or feedback to the news. These user-generated texts provide a rich source of user's sentiment and opinions. Potentially, such text can reveal both qualities of the athlete or performances of the athlete that are liked and the users' sentiments on each of the qualities of the athlete or performances of the athlete. These described qualities of an athlete or performances of an athlete, described by the users in the text, play the same role with the meta-data in content-based filtering but are more valuable for the recommender system. Users' sentiments on the athletes can be regarded as a multi-dimensional rating score, reflecting their preference, or liking towards an athlete.

In an embodiment, sentiment analysis model uses machine learning to figure out an essence of the statement. In this approach, the machine learning algorithms learn under supervision. An algorithm is trained with many sample passages until it can predict with accuracy the sentiment of the text. Then large pieces of text are fed into a classifier and the model is used to predict the sentiment as negative, neutral, or positive. In an embodiment, rules for data classification are used to determine sentiment. In this approach, words with positive or negative values denote their polarity and sentiment strength to calculate a score. In an embodiment, expressions may also be used. In an embodiment, rule-based sentiment analysis algorithms may be customized based on context. In an embodiment, machine learning methods such as Naïve Bayes, Logistic Regression and Support Vector Machines (SVM) are used. In another embodiment, deep learning models are used which include neural network models such as CNN (Convoluted Neural Network), RNN (Recurrent Neural Network), and DNN (Deep Neural Network).

Figure 3A:
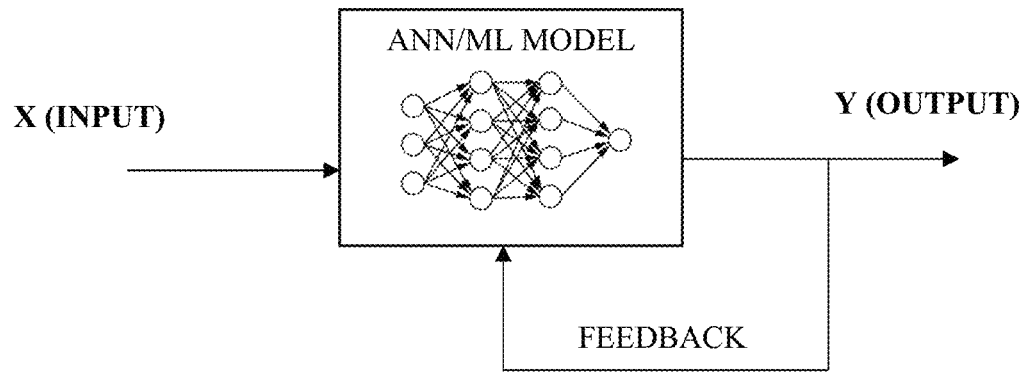
FIG. 3A shows a structure of the neural network/machine learning model with a feedback loop according to an embodiment of the system.

FIG. 3A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict the performance of an athlete based on the input data.

In an embodiment, ANN's may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labeled data and concepts, after a while, the models' performance may decline while adding new, unlabeled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabeled data is assimilated. A feedback loop refers to the process by which an AI model's predicted output is reused to train new versions of the model.

Initially, when the AI/ML model is trained, a few labeled samples comprising both positive and negative examples of the concepts (for e.g., a specific sport performance metrics for example batting average (AVG), slugging percentage (SLG), on-base percentage (OBP), on-base percentage plus slugging percentage (OPS) in a baseball game) are used that are meant for the model to learn. Afterward, the model is tested using unlabeled data. By using, for example, deep learning and neural networks, the model can then make predictions on a stock price based on the performance metrics of the athlete in the current game, athlete's profile, historic performance, and the news feeds that may affect the game or the athlete in either the current game or in future games. Each prediction is given a probability score where higher scores represent a higher level of confidence in the models' predictions. Where a model gives an image a high probability score, it is auto labeled with the predicted concept. However, in the cases where the model returns a low probability score, this input may be sent to a controller (may be a human moderator) which verifies and, as necessary, corrects the result. The human moderator may be used only in exceptional cases. The feedback loop feeds labeled data, auto-labeled or controller-verified, back to the model dynamically and is used as training data so that the system can improve its predictions in real-time and dynamically.

According to an embodiment of the system, the machine learning model is configured to learn using labeled data using a supervised learning, wherein the supervised learning comprises logic using at least one of a decision tree, a logistic regression, a support vector machine, a k-nearest neighbors, a Naïve Bayes, a random forest, a linear regression, a polynomial regression, and a support vector machine for regression.

According to an embodiment of the system, the machine learning model is configured to learn from the real-time data of the game using an unsupervised learning, wherein the unsupervised learning comprises logic using at least one of a k-means clustering, a hierarchical clustering, a hidden Markov model, and an apriori algorithm.

Figure 3B:
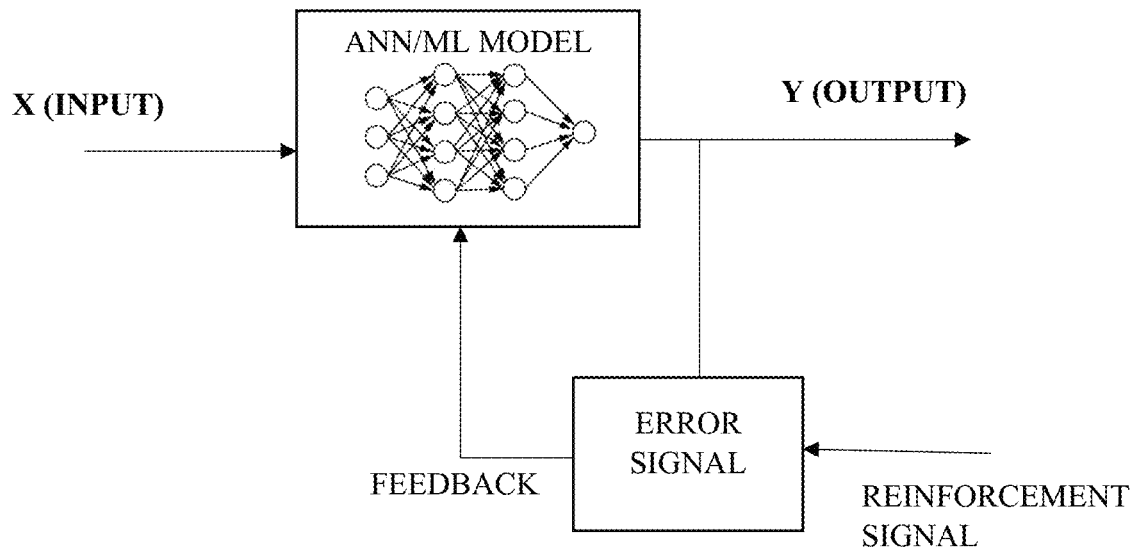
FIG. 3B shows a structure of the neural network/machine learning model with reinforcement learning according to an embodiment of the system.

FIG. 3B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to predict the stock price based on multidimensional data relating to the athlete. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time. According to an embodiment of the system, the machine learning model has a feedback loop, wherein learning is further reinforced with a reward for each true positive of an output of the system.

According to an embodiment of the system, the machine learning model has a feedback loop, wherein an output from a previous step is fed back to the machine learning model in real-time to improve accuracy of the output of a next step from the machine learning model.

According to an embodiment of the system, the machine learning model comprises a recurrent neural network model.

Figure 3C:
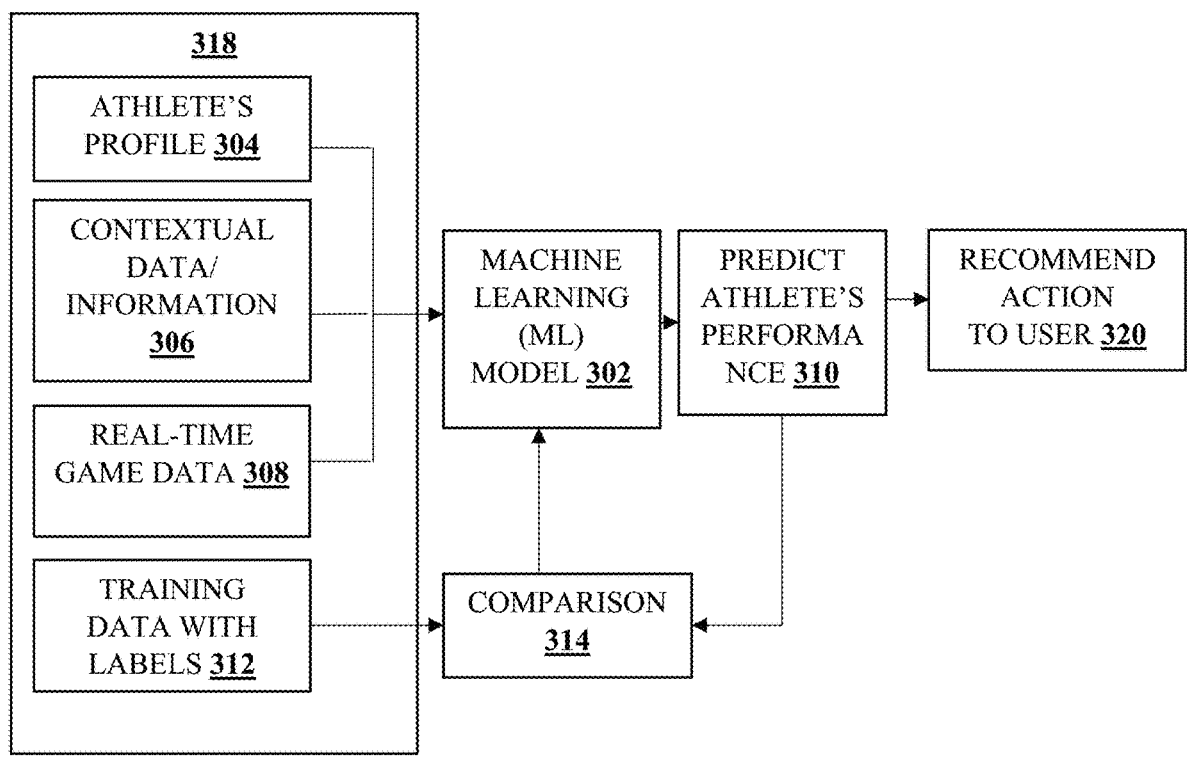
FIG. 3C shows an example block diagram for determining a stock price using a machine learning model.

FIG. 3C shows an example block diagram for determining a recommendation using a machine learning model. The machine learning model 302 may take as input any data associated with the athlete and learn to identify features within the data that are predictive of an athlete's performance. The training data sample may include, for example, the athlete's profile data 304, such as the age, gender, weight, height, games played, records, peak performance, ethnicity, past health conditions, sports injuries, etc. In an embodiment, it relates to systems and methods that predict athletes' performance and trigger a recommendation for a user for a stock price. Athlete's information is transmitted to the cloud, where the athlete's information is coupled with available public information of the athlete and the game the athlete is associated with. The systems and methods of the present disclosure may also provide data analytics information that may be used later to improve the athlete's performance prediction and stock price prediction that can be used for generating recommendation for the user ahead of the match or ahead of the future happening. For example, as the match is progressing, a recommendation engine may recommend an athlete's stock while the game is in progress based on a prediction made.

In an embodiment, the training data sample may also include current contextual information 306 relating to the athlete and the game the athlete is associated with. This may include, for example, athlete's profile, location of the game, current weather condition, temperature, time of day, athletes', or teams' position in the series of games, depth of the athlete in the game, past performance under similar conditions, total wins at the location of the game, totals losses at the location of the game, total wins of the matches at all locations, total losses of the matches at all locations, etc. The system may also garner contextual information 306 from social media. For example, through an application installed on a user device, for example, a sports news channel application, an application related to a sport, the system may analyze the users' comments on such channels and determine a fan base of the athlete. For example, the user's state of mind may be obtained from a sentiment analysis performed on such contextual data. The system may correlate the contextual data with the game historical data, athlete's profile, etc. According to an embodiment of the system, a sentiment analysis is performed on the contextual data to analyze a popularity of the athlete. In an embodiment, the application may access other types of application usage data from other applications (including the operating system) installed on the users' device and use them as contextual information 306. This may include other applications that are being used before and/or during the game (e.g., whether it was a news channel, sports channel, live telecast channel, sports betting channel, etc.). In an embodiment, a microphone installed in the mobile device of the user may access the conversation of the users on the game or a specific athlete. The application may also query the other applications for data relating to the user, for example, user's age, user's gender, user's circle of friends, user's family, user's friends', interests, etc. which may also serve as contextual information 306.

Real-time game data 308 may include, for example, video, image, audio, text updates, sports channel, sports website, and any other suitable types of data that can be used to capture the game and game state along with the athlete's performance in the game. In an embodiment, the real-time game data may be processed using one or more machine learning models 302 trained and based on similar types of data to predict real-time performance of the athlete and also the user's current mood. The real-time features may include, for example, the athletes' performance, the user's current mood via sentiment analysis (e.g., happy, angry, sad, etc.), and/or any other features that may characterize or represent the user's inclination towards an athlete and the game. Current information about the user may be used for the prediction of the athlete's performance and generate a recommendation about stock price associated with the athlete. For example, current performance in the game of the athlete and/or previously known information about the athlete and the game may be used to predict performance of the athlete and provide a recommendation to a user for a stock and a trade option whether to buy or sell, dynamically associated with the athlete of the game.

Any of the aforementioned types of data (e.g., athletes' profile data 304, contextual information 306, real-time game data 308, or any other data such as social media content about the game and the athlete) may correlate with the user's disposition, and such correlation may be automatically learned by the machine learning model 302. In an embodiment, during training, the machine learning model 302 may process the training data sample (e.g., athletes' profile 304 and/or contextual information 306) and, based on the current parameters of the machine learning model 302, predict athlete's performance 310. The prediction of an athlete's performance 910 may depend on the training data with labels 312 associated with the training sample 318. Predicting an athlete's performance refers to predicting a future event based on past and present data and most commonly by analysis of trends or data patterns. Prediction or predictive analysis employs probability based on the data analyses and processing. Predicted events may not be realized based on how the turn of events happens. In an embodiment, during training, a predicted athlete's performance at 310 and the training data with labels 312 may be compared at 314. For example, the comparison 314 may be based on a loss function that measures a difference between the detected or predicted athlete's performance 310 and the training data with labels 312. Based on the comparison at 314 or the corresponding output of the loss function, a training algorithm may update the parameters of the machine learning model 302, with the objective of minimizing the differences or loss between subsequent detections or predictions of the athlete's performance 310 and the corresponding labels 312. By iteratively training in this manner, the machine learning model 302 may "learn" from the different training data samples and become better at predicting athlete's performance from the real-time game data 308 that are similar to the ones represented by the training labels at 312. In an embodiment, the machine learning model 302 is trained using data which is general to the athletes and the game and is used for a specific athlete for predicting athlete's performance and providing a recommendation to the user 320 about an athlete and the stock value of an athlete.

Using the training data, a machine learning model 302 may be trained so that it recognizes features of input data that signify or correlate to certain event types. For example, a trained machine learning model 302 may recognize data features that signify the likelihood of a peak event. The features may also be unintelligible to humans and may simply represent data patterns that tend to be present when certain event types occur. Through training, the machine learning model 302 may learn to identify predictive and non-predictive features and apply the appropriate weights to the features to optimize the machine learning model's 302 predictive accuracy. In embodiments where supervised learning is used and each training data sample 318 has an athlete's performance label 312, the training algorithm may iteratively process each training data sample 318 (including athlete's profile data 304, contextual information 306, and/or real-time game data 308), and generate a prediction of athlete's performance 310 based on the model's 302 current parameters. Based on the comparison 314 results, the training algorithm may adjust the model's 302 parameters/configurations (e.g., weights) accordingly to minimize the differences between the generated prediction of athlete's performance 310 and the corresponding labels 312. Any suitable machine learning model and training algorithm may be used, including, e.g., neural networks, decision trees, clustering algorithms, and any other suitable machine learning techniques. Once trained, the machine learning model 302 may take input data associated with the athlete and the game and output one or more predictions that indicate a likelihood that a predicted athlete's performance would occur, and rank based on a score produced to the athletes accordingly.

According to an embodiment of the system, an input to the machine learning model of the system comprises the profile of the athlete, a contextual data comprising a material news that affects at least one of a future game of the athlete and a sentiment of fans. According to an embodiment of the system, a sentiment analysis is performed on a material news to identify a popularity of the athlete. According to an embodiment of the system, a sentiment analysis is performed on a material news to tag the material news as at least one of a positive news, a negative news, and a neutral news.

A scoring system: Share prices, according to an embodiment, are directly related to an athlete's actual scoring performance in comparison to their predicted scoring performance. Scoring algorithms are different for each game or league. Scoring algorithms, according to an embodiment, are present for some games or leagues.

The collected information associated with the athlete may be processed by a scoring engine to produce a score for that athlete. In one implementation, analytical methods may be used, such as predictive analytics functions, to produce a predicted score for the athlete. Based on the computed score, a stock price may be determined. Further, the scoring information may be used to improve the quality of data collection, as elements that are more highly indicative of athlete value may be associated and stored with the model of the athlete.

In an embodiment, social networks can also be used as a tool to collect additional behavioral, preferential, demographical data, etc., that can be used to build the athlete profile and build a more complete model of the athlete for predictions about their value, preferences, and future behavior.

According to an embodiment, the performance information includes a rating of the athlete, according to another embodiment. The performance information includes win/loss statements information, wherein the act of determining a rating of the athlete further comprises determining an overall win/loss performance based on a plurality of win/loss statements collected from the plurality of independent games played.

In an embodiment, social networks can also be used as a tool to collect additional behavioral, preferential, demographic data that can be used to build the user profile and to make predictions about the athlete's future performance and stock value.

According to another embodiment, the method further comprises an act of maintaining a machine learning based predictive model of the athlete and determining at least one score based on the predictive model.

According to an embodiment, a predictive scoring method is provided that predicts the capacity of an athlete before that athlete starts playing. According to one embodiment, one goal of predictive scoring of an athlete is to assess the athlete's ideal, potential maximum value of the performance, their value in the game, their likeability, etc. This information is important information in determining how an athlete should be valued in terms of stock volume and individual stock price.

A number of different sources may be used to collect information (e.g., behavior offline, demographic data (e.g., age, gender, zip code, etc.)). Such information may be collected in various ways as discussed above (e.g., using a questionnaire via a web form), social media accounts, public interviews, etc. One or more elements of this collected information may have relevance to the athlete that is desired to be measured by a "score" or other type of rating. Elements indicative of this "score" may be combined in a function f(n) that produces an output score for a particular athlete. In one embodiment, a reference dataset or set of profiles may be used as a basis of comparison to the collected athlete information, and the similarity to the reference set may determine what score is attributed to the athlete.

Further, the function that determines the score may be blended among the elements indicative of the characteristic to be measured. In one implementation, the blended function may be weighted to highlight elements that are more indicative of the performance of the athlete. The information may be submitted to a scoring engine that is capable of determining a score based on a number of inputs.

Scoring may involve a blending of several analytical methods. One goal of scoring is to produce the most optimal and error-free result possible. Although analytical methods may be used, it should be appreciated that other types of mathematical tools can be used to produce a score, including, but not limited to predictive modeling, scoring of models and forecasting. According to one embodiment, blending and comparison of these functional results is significant in producing an accurate score. Predictive modeling is commonly described as a process by which a model is created or chosen to try to best predict the probability of an outcome. In many cases, models are chosen based on detection theory to try to guess the probability of a signal given a set amount of input data.

A scoring engine can apply a blend of statistical techniques, including but not limited to Predictive Models, Decision Models, Descriptive Models, Linear Regression Models, Discrete Choice Models, Logistic Regression, Time-based Regression, Multinomial Logistic Regression, Probit Regression, Time Series Models, Survival & Duration Analysis, Non-parametric techniques, machine learning techniques, support vector machines, Neural Networks, radial basis functions, k-nearest neighbors, among others.

According to one embodiment of the present invention, a number of parameters may be identified that relate to a known "score" for the athletes. This known information may be stored within the reference database and athletes having similar sets of parameter values may be identified as being more similar to other athletes that produce these known scores. In the case of a support vector machine, a learning machine may be trained on a number of known parameters for particular athletes that have known scores. Such parameters may be, for example, data elements as recorded within the reference database such as, for example, age, gender, zip code, or other set of information that is correlated to a known score. Known scores for athletes may be modified from time to time as athletes exhibit different behavior within the real world or in live game performances. Once a learning machine is trained on a set of known data, that learning machine may be capable of predicting a possible score related to an athlete having particular parameter values (e.g., age, gender, zip code, etc.). Using learning machines to estimate values or classify a particular data may be used in order to determine the relative score of an athlete to other known athletes and to predict and classify an athlete based on a limited set of information.

Once a score is produced, it is important to determine the accuracy of that score. Once this potential athlete starts producing play history, statistical techniques can be used to determine the most significant indicators of value when compared to the referential data set. It is also important to note that the difference between the athlete's actual value on property and the predicted value can roughly indicate the overall error in prediction. Adding this error as an element of the reference data set can help to make a stronger model for future predictions. In one example, a score of similar athletes has an error range of 5%-10%. Tracked play can also be added to the reference data set, along with significant indicators, to produce a stronger model for future prediction. For instance, the score may be provided to the system or network via an API, a database, a cookie, or other similar transmissions mechanisms.

Other simpler scoring methods may also be used to determine the score of an athlete. In one example, the play of an athlete may be measured by only viewing an athlete's performance points and how they increase or decrease over time. These changes may be indexed against a database of known point values to determine the value of the athlete. Then, this data can be used to predict how an athlete might be valued for a stock where play history has not been established.

In another example, the system may build a list of keywords that indicate an affinity of the users for the athlete and the game. The system may perform data mining of publicly available data sets, such as blogs, message boards and email systems for these keywords and then associating these keywords to perform sentiment analysis.

Also, an athlete's game may be monitored and used to determine a score. For instance, frequency, duration, average bet size, performance, etc., of the games that are played by the athlete can be used to score an athlete. This data can then be used to determine a stock price. A scoring engine may be used to compare a number of inputs reflective of the attributes of the athlete profiles that are potential predictive indicators of the future performance of the athlete and hence a future value of the athlete.

Examples

According to an embodiment, a scoring method is discussed for MLB, NFL, and NHL.

Similar methods may be used for other sports as well. In some embodiments, the current performance function may include spot on depth chart, athlete's position etc., depending on the factors that are relevant to the game.

Major League Baseball Scoring:
  Price of stock for pitchers=factor X function (current performance (innings pitched, strikeouts, earned runs allowed, hits against, hits to batsmen, completed games, completed game shutouts, no hitters); historical performance;)
  Price of stock for hitters=factor X function (current performance (singles, doubles, triples, home runs, runs batted in, runs, walks, hits by pitcher, stolen bases); historical performance;)

National Football League Scoring:
  Price of stock for Quarterbacks=factor*function (current performance (total yards, touchdowns, interceptions); historical performance;)
  Price of stock for Wide Receiver=factor*fun (current performance (total yards, touchdowns, fumbles); historical performance;)
  Price of stock for Running Back=factor*function (current performance (total yards, touchdowns); historical performance;)
  Price of stock for Tight End=factor*function (current performance (total yards, touchdowns, holds); historical performance;)
  Price of stock for Team Defense=factor*function (current performance (blocks, safety, forced fumbles, recovered fumbles, intercepts, sacks, points allowed rating); historical performance;)

National Hockey League Scoring:
  Price of stock for Skaters—Season Market=factor*function (current performance (goals, assists); historical performance;)
  Price of stock for Skaters—Daily Market=factor*function (current performance (goals, assists, blocked shots, shots); historical performance;)
  Price of stock for Goalies=factor*fun (current performance (wins, shutouts); historical performance;)

Where, factor is a numeric value that can be used to adjust or modify the stock price in a specific range, and function is a relation or expression involving one or more variables.

According to an embodiment of the system, the stock price is further influenced by a depth chart translated into a value.

According to an embodiment of the system, the stock price is further influenced by a position of the athlete in the game.

Implementation of Trading Platform using Blockchain Technology: The online trading platform of the system uses blockchain technology to calculate a stock price, an athletes' profile value. The complex formula may take a considerable amount of computational math to quantify stock prices in real-time and the use of blockchain technology makes implementation easier, manageable, and maintainable.

Blockchain technology facilitates transaction verification and recording immediately and permanently. When a transaction is recorded in the blockchain, details of the transaction, such as price, asset, and ownership, are recorded, verified, and settled within seconds across all nodes.

Blockchain technology is also used for maintaining athlete profiles and various statistics. The online trading platform of the system uses an append-only data structure, meaning new profile data and athletes' statistics are added on to a blockchain, and past data cannot be erased. This approach results in a verifiable and permanent record of data. Similarly, the stock transaction data is added to the blockchain as a new block and the past transaction data cannot be erased.

To elaborate, the difference between a typical database and a blockchain is how the data is structured. A blockchain collects information (athletes' stats) together in groups, known as blocks, which hold sets of information. Blocks have certain storage capacities and, when filled, are closed, and linked to the previously filled block, forming a chain of data known as the blockchain. All new information that follows that freshly added block is compiled into a newly formed block that will then also be added to the chain once filled.

The goal of the online trading platform of the system using blockchain technology is to allow digital information to be recorded and distributed, but not edited. In this way, a blockchain is the foundation for immutable ledgers, or records of transactions that cannot be altered, deleted, or destroyed.

To maintain the athlete's profile and various statistics, the system uses blockchain technology. Blockchain technology is the most appropriate application given the system required to implement an append-only data structure, meaning new profile data and athletes' statistics are added on to a blockchain, and past data cannot be erased. This approach results in a verifiable and permanent record of data. Similarly, the stock transaction data is added to the blockchain as a new block and the past transaction data cannot be erased. On a given NFL gameday there are 5 to 6 games played simultaneously with 22 athletes on the field per game, with all the games combined there are around 132 athletes on the field and storing the athletes' statistics for every single play in a compressed time is very critical. The computation, sorting, and storing of statistics must be completed at a significantly fast pace and, as a result, the demand for computing power required is exponential, thus a peer-to-peer nature of the blockchain and distributed ledgers are solutions to implement the tasks.

In an embodiment, an existing database is considered and a blockchain feature is added on top of it. In this embodiment, two database layers are used, wherein a first layer utilizes a lightweight distributed consensus protocol that ensures integrity level, while providing good performance for querying; and a second layer uses a Proof of Work (PoW) based blockchain to store evidence of the database operations from the first layer. In an embodiment, the first layer and the second layer are connected through a blockchain anchoring mechanism. The blockchain anchoring mechanism links parts of the first layer with blocks in the second layer. This creates a chain of evidence validating data from the first layer.

Figure 4:
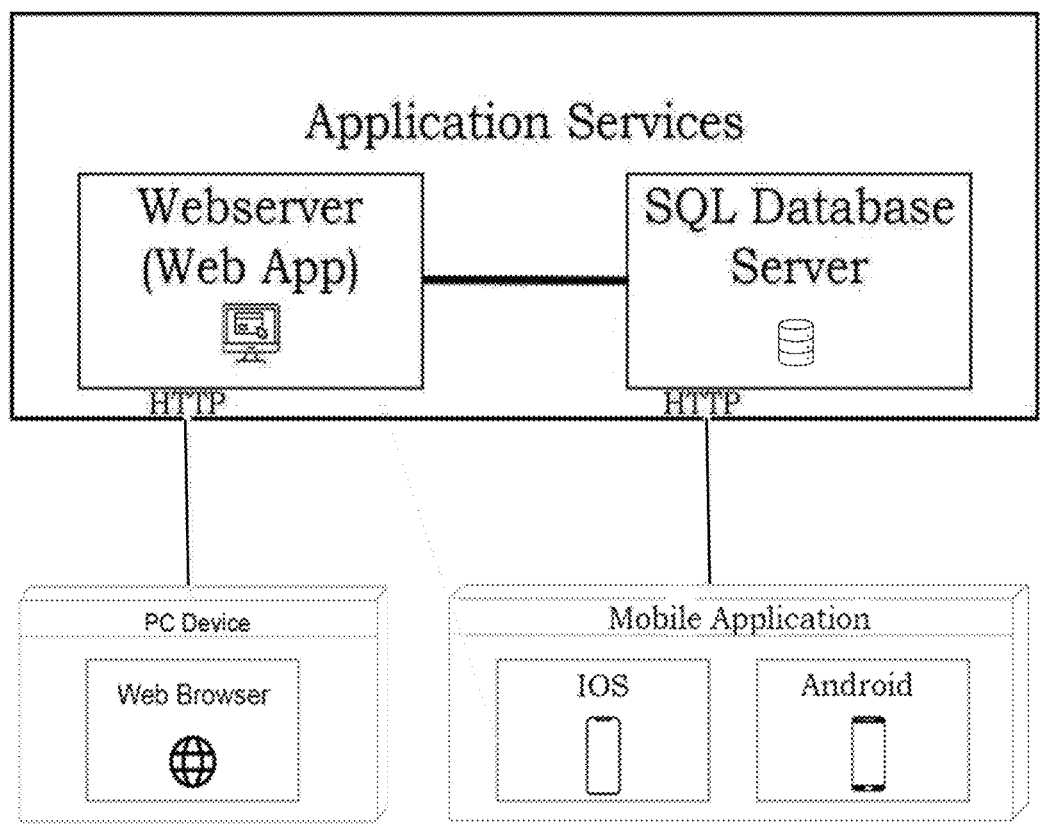
FIG. 4 shows the trading application services that will be implemented to handle the trading activities through a web browser and through mobile devices with iOS and Android® applications according to an embodiment.

FIG. 4 shows the trading application services that will be implemented to handle the trading activities through a web browser and through mobile devices with iOS and Android® applications according to an embodiment. Application services comprises Web server and SQL database server. The Webserver will host and support the user interface capturing user's actions in terms of login, credentialing, viewing account detailing, capturing trade requests. Essentially, Webserver captures all the actions taken by users. The SQL Database Server functions as a service provider fulfilling all the requests sent by Webserver and accessing the SQL database to retrieve information and provide it back to the Webserver to in turn return to the users. Application Program Interface (APIs) are used to create an information channel passing the information or data back and forth between Webserver and SQL Database Server. The APIs which can be accessed via a communication system on a PC device or via a mobile application.

Figure 5A:
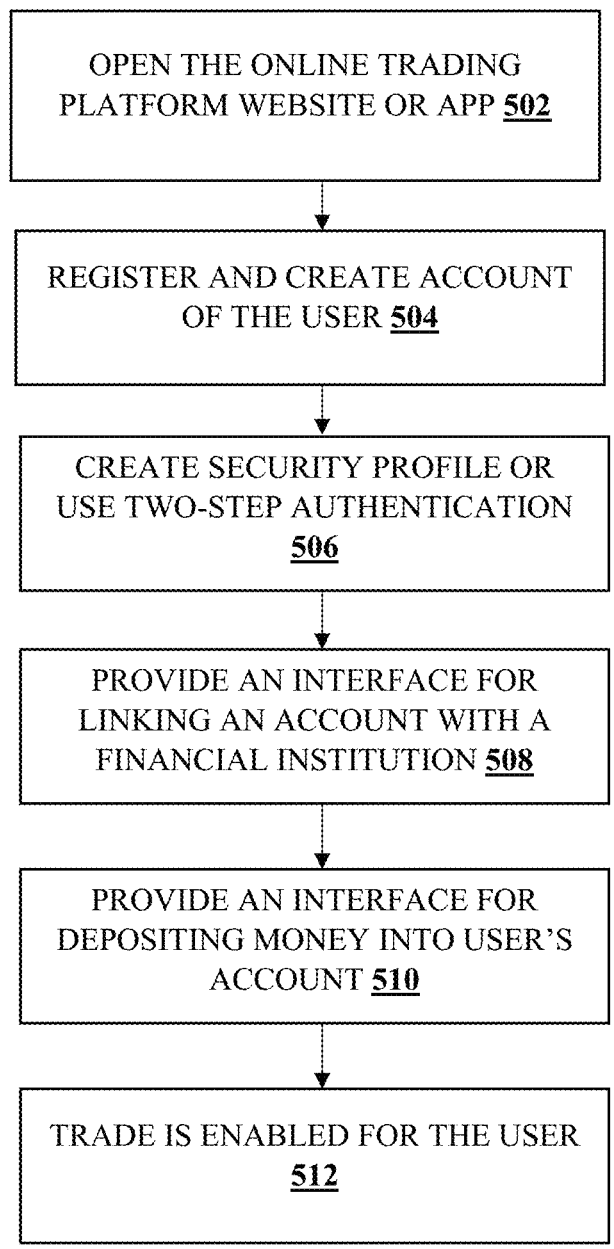
FIG. 5A shows the process for trading on the trading platform of the system according to an embodiment.

FIG. 5A shows the process for trading on the trading platform of the system according to an embodiment. The platform is designed to work seamlessly for the users to fund their account via Automated Clearing House (ACH), wire transfer, Paypal®, credit, or debit cards.

The process comprises opening the online trading platform website or app at 502. The system then enables the user to register on the online trading platform and create an account at 504 by creating username and password. The system enables the user to create a security profile and/or create a two-level authentication as shown at step 506. The system then enables the user and guides through the steps to link the account to a financial institution at step 508. Once the account is successfully connected to a financial institution, the system enables the user to deposit an amount into the account on the trading platform as shown at 510 and the system then enables trading as shown at step 512. The online trading platform of the system is designed to be interactive and user-friendly. The user interface of the trading platform will allow the users to create their online account and connect their account with their financial institution to fund or withdraw money easily.

Figure 5B:
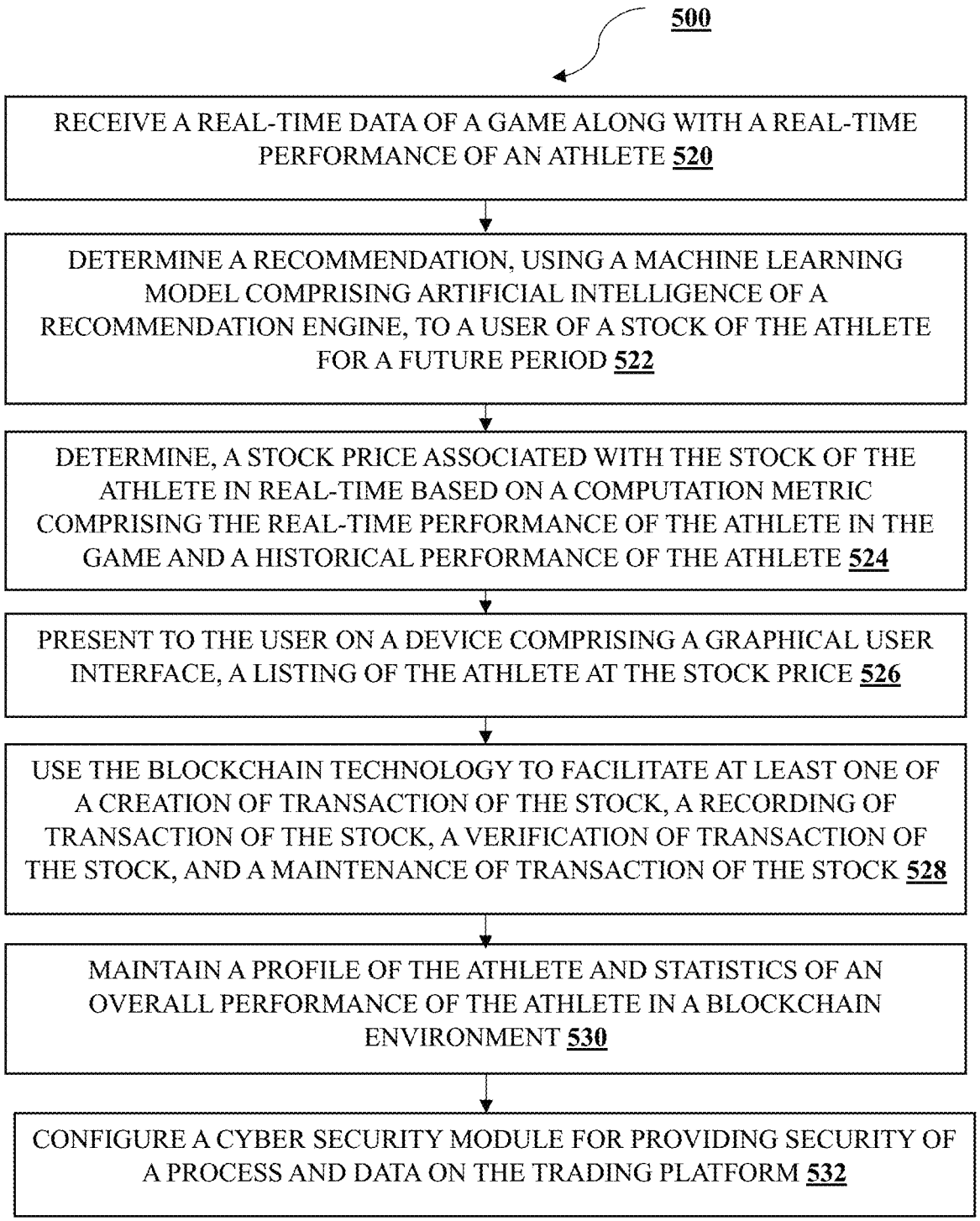
FIG. 5B shows a flow chart for trading the stock of the athlete based on the profile of the athlete on a trading platform according to an embodiment.

FIG. 5B shows a flow chart for trading the stock of the athlete based on the profile of the athlete on a trading platform according to an embodiment.

An embodiment relates to a method 500 comprising: receiving a real-time data of a game along with a real-time performance of an athlete as shown at 520; determining a recommendation, using a machine learning model comprising artificial intelligence of a recommendation engine, to a user of a stock of the athlete for a future period as shown at 522; determining, a stock price associated with the stock of the athlete in real-time based on a computation metric comprising the real-time performance of the athlete in the game and a historical performance of the athlete, wherein the stock price of the athlete is computed using a blockchain technology as shown at 524; presenting to the user on a device comprising a graphical user interface, a listing of the athlete at the stock price, wherein the listing is dynamic based on at least one of the stock price, a play sequence of the athlete, a ranking of the athlete, statistics of the game, and a watchlist of the user as shown at 526; wherein the blockchain technology is configured to facilitate at least one of a creation of transaction of the stock, a recording of transaction of the stock, a verification of transaction of the stock, and a maintenance of transaction of the stock as shown at 528; wherein the blockchain technology is configured to maintain a profile of the athlete and statistics of an overall performance of the athlete in a blockchain environment as shown at 530; wherein the method is configured for trading the stock of the athlete based on the profile of the athlete on a trading platform; and wherein a cyber security module is configured for providing security of a process and data on the trading platform.

An embodiment relates to a non-transitory computer-readable medium having stored thereon instructions executable by a computer system to perform operations comprising: receiving a real-time data of a game along with a real-time performance of an athlete; determining a recommendation, using a machine learning model comprising artificial intelligence of a recommendation engine, to a user of a stock of the athlete for a future period; determining, a stock price associated with the stock of the athlete in real-time based on a computation metric comprising the real-time performance of the athlete in the game and a historical performance of the athlete, wherein the stock price of the athlete is computed using a blockchain technology; presenting to the user on a device comprising a graphical user interface, a listing of the athlete at the stock price, wherein the listing is dynamic based on at least one of the stock price, a play sequence of the athlete, a ranking of the athlete, statistics of the game, and a watchlist of the user;

wherein the blockchain technology is configured to facilitate at least one of a creation of transaction of the stock, a recording of transaction of the stock, a verification of transaction of the stock, and a maintenance of transaction of the stock; wherein the blockchain technology is configured to maintain a profile of the athlete and statistics of an overall performance of the athlete in a blockchain environment; wherein the instructions executable by the computer system are configured for trading the stock of the athlete based on the profile of the athlete on a trading platform; and wherein a cyber security module is configured for providing security of a process and data on the trading platform.

Figure 5C:
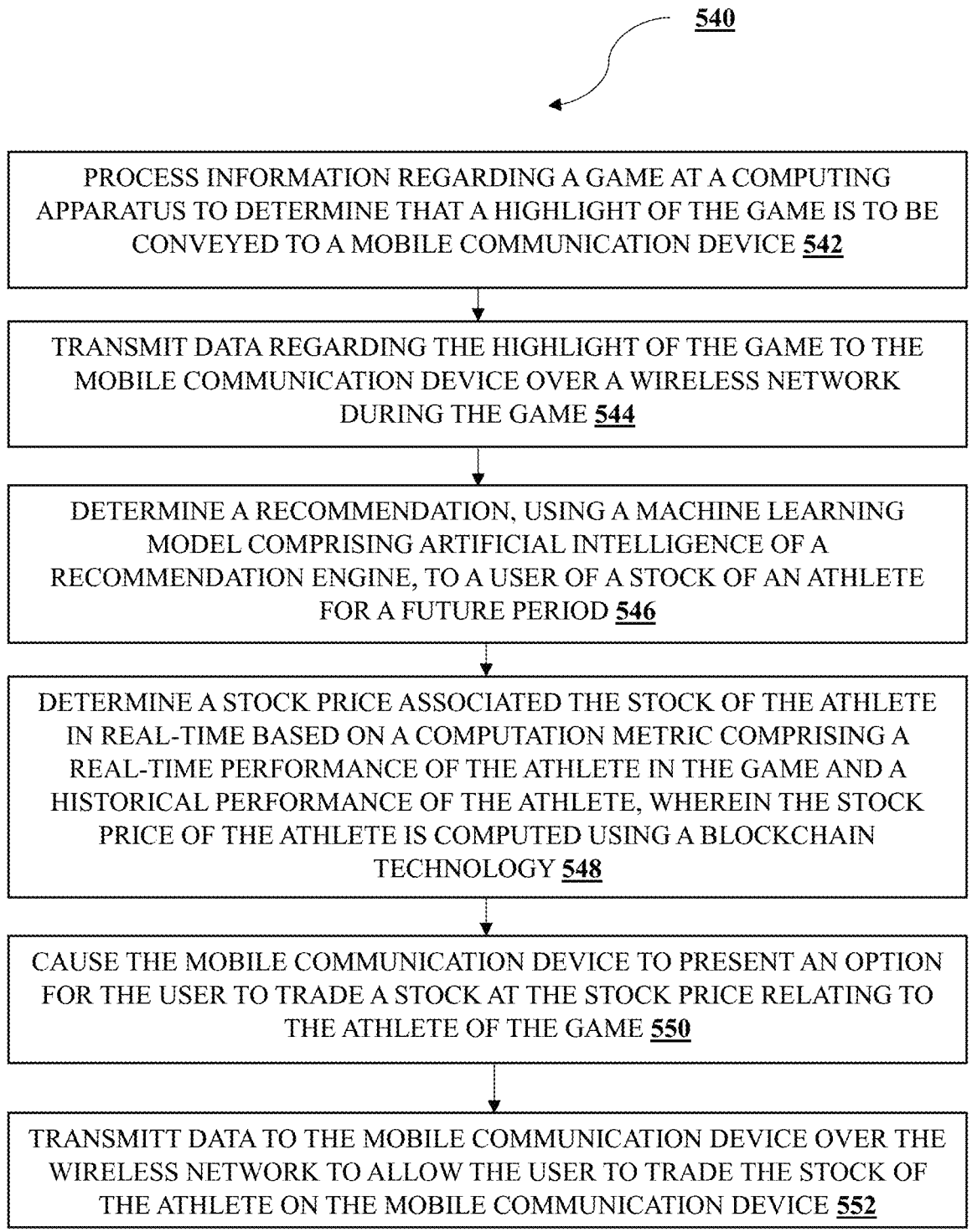
FIG. 5C shows a flow chart for trading the stock of the athlete when viewing highlight of the game based on the profile of the athlete on a trading platform according to an embodiment.

FIG. 5C shows a flow chart for trading the stock of the athlete when viewing highlight of the game based on the profile of the athlete on a trading platform according to an embodiment. An embodiment relates to a method 540 comprising: processing information regarding a game at a computing apparatus to determine that a highlight of the game is to be conveyed to a mobile communication device as shown at 542; transmitting data regarding the highlight of the game to the mobile communication device over a wireless network during the game as shown at 544; determining a recommendation, using a machine learning model comprising artificial intelligence of a recommendation engine, to a user of a stock of an athlete for a future period as shown at 546; determining a stock price associated the stock of the athlete in real-time based on a computation metric comprising a real-time performance of the athlete in the game and a historical performance of the athlete, wherein the stock price of the athlete is computed using a blockchain technology as shown at 548; causing the mobile communication device to present an option for the user to trade a stock at the stock price relating to the athlete of the game as shown at 550; and transmitting data to the mobile communication device over the wireless network to allow the user to trade the stock of the athlete of the game on the mobile communication device as shown at 552; and wherein the method is configured to be executed on the mobile communication device to view a part of the game and trade the stock in real-time relating to the athlete while the game is occurring.

Figure 6:
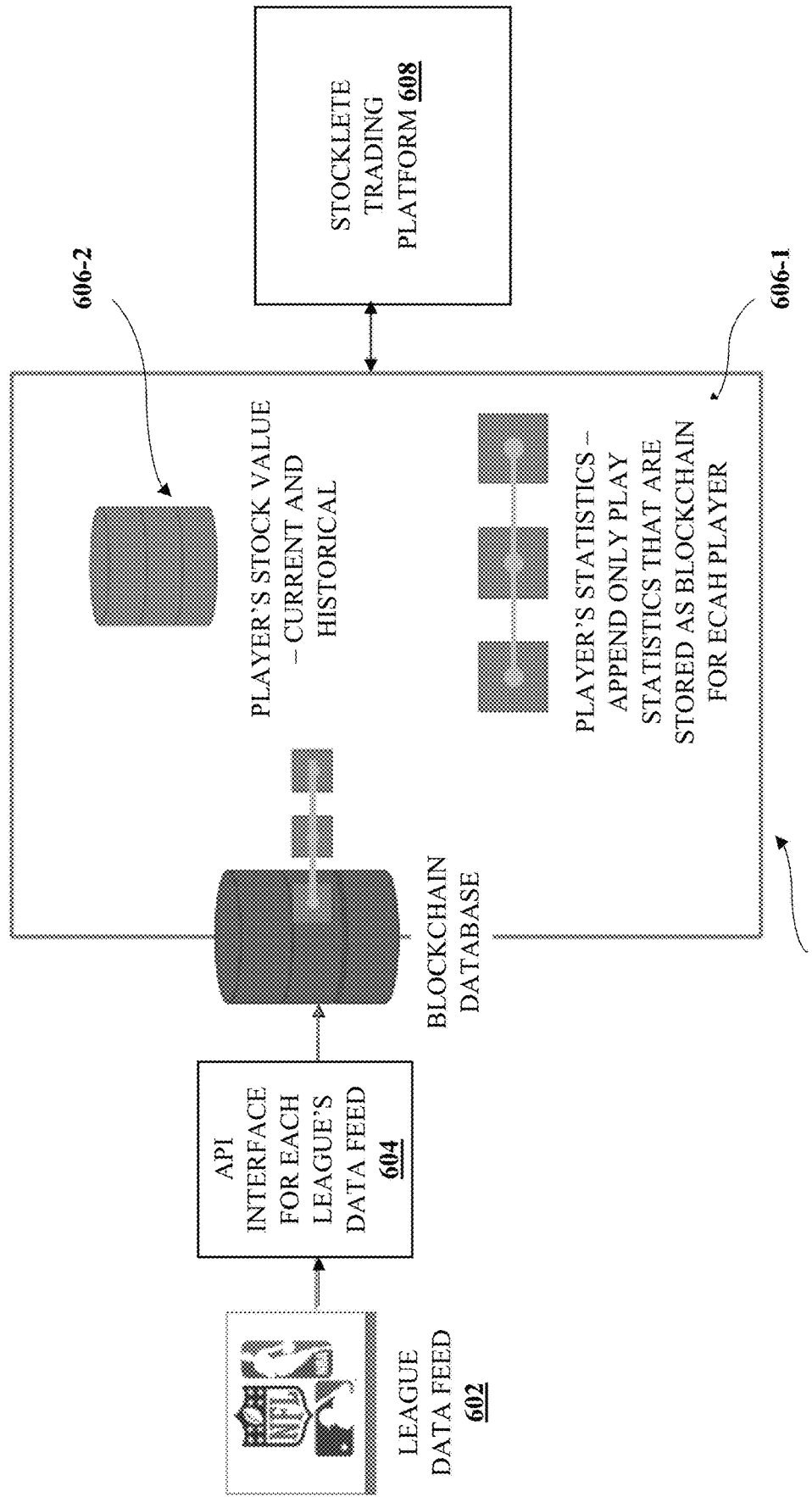
FIG. 6 shows an implementation of the blockchain architecture for the trading platform of the system according to an embodiment.

System Architecture: FIG. 6 shows an implementation of the blockchain architecture for the trading platform of the system according to an embodiment. Live data stream or real-time data from a league or a game as shown at 602 is provided via the API interface as shown at 604 to a blockchain database as shown at 606. The blockchain database as shown at 606 stores the athlete's statistics and appends as a block to the blockchain journal as shown at 606-1. Based on each play, a computational formula calculates s stock value for the athlete involved in the play as shown at 606-2 and updates the database. Traders, who are trading in real-time on the trading platform of the system (which is referred to as StockLete Trading Platform as shown at 608) can see the reflection of the stock price in real-time and can place a trade. According to an embodiment of the system, at an end of the game, the statistics of the game and the profile of the athlete are revised and appended as a new block in a blockchain.

Figure 7:
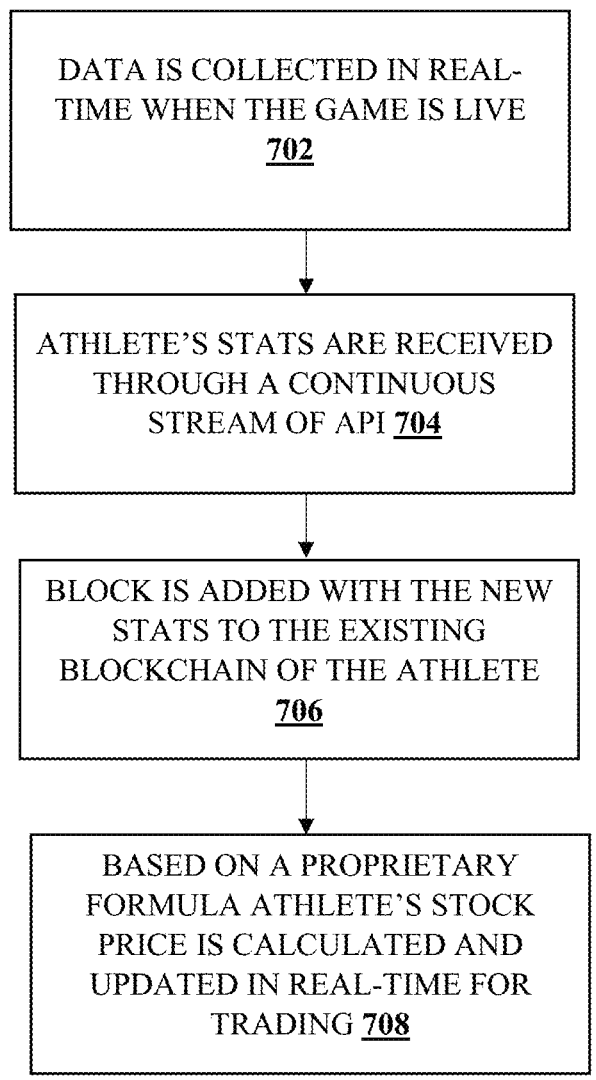
FIG. 7 shows the process of the trading platform implementation on blockchain technology according to an embodiment of the system.

FIG. 7 shows the process of the trading platform implementation on blockchain technology according to an embodiment of the system. The process comprises steps of collecting the data in real-time when the game is live at step 702. For example, in an American football game (NFL) an athlete who is a quarterback (QB) makes a 50-yard touchdown pass or a center back (CB) makes a 40-yard pick six (interception and touchdown), these statistics of the sport are collected in real-time. The statistics are then received by the trading platform through a continuous stream of APIs as shown at 704. A block is added with the new statistics to the existing blockchain of the athlete as shown at 706 and the statistics are stored as a block. Based on a proprietary formula, the athlete's stock price is calculated and updated in real-time for trading as shown at 708. The determined stock price is then made available for the traders to trade on the online trading platform.

System Processing: By implementing blockchain technology, the system is able to achieve decentralized security and trust in several ways. For example, new blocks are always stored linearly and chronologically, so they are always added at the end of the blockchain. Once a block is added at the end, it is extremely difficult to go back and alter the contents of the block. Profile and statistics of each athlete will be stored as a blockchain. At the end of each game, the game statistics and revised profile will be added (appended) as a new block in the blockchain. With the implementation of this technology, it is extremely difficult to go back and alter the contents of the block.

Figure 8:
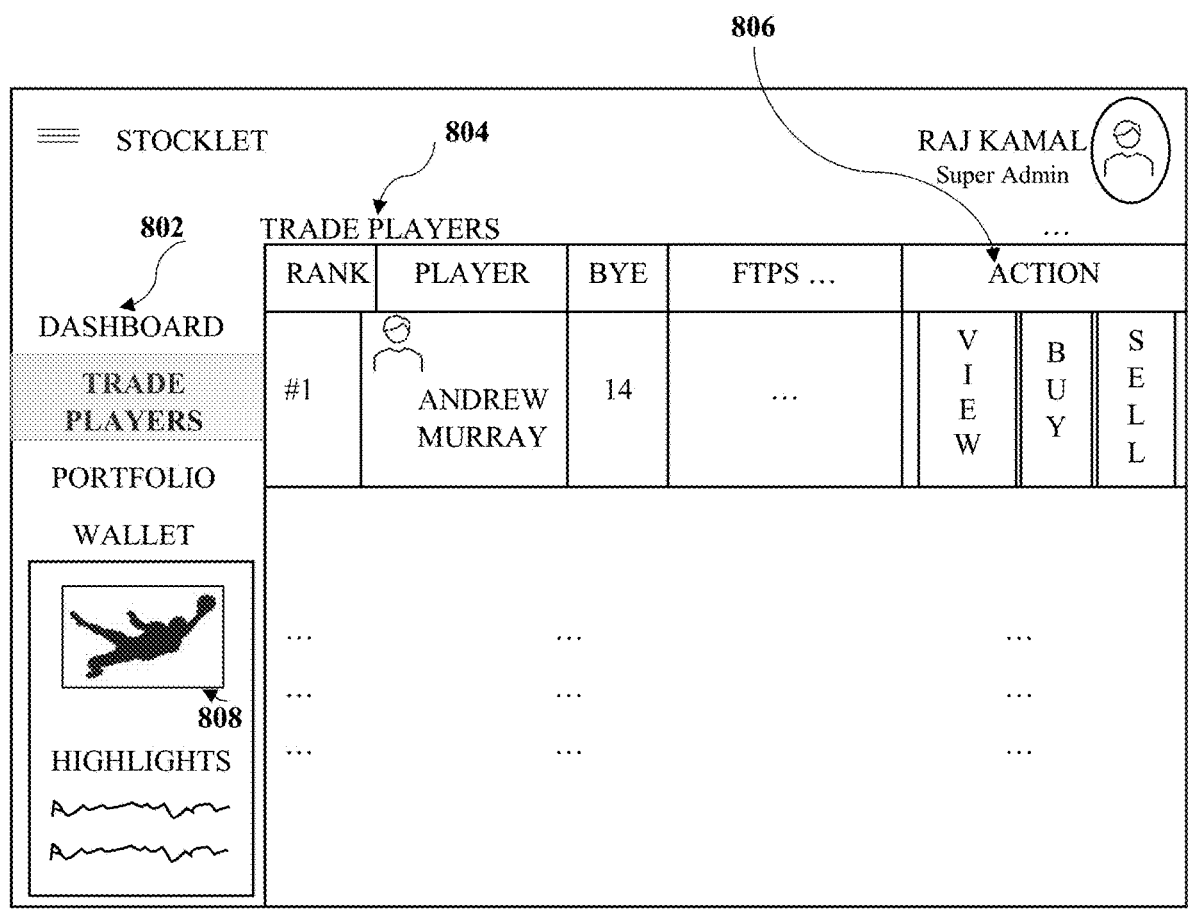
FIG. 8 shows the graphical user interface of the trading platform which will be used by the users during the trading session.

System Functionality: The traders or users should be able to review each athlete's statistics through a very intuitive user interface that retrieves information stored in the blockchain. With the human-centric user interface, the users should be able to buy and sell any stock with one click. FIG. 8 shows the graphical user interface of the trading platform which will be used by the users during the trading session. The trading platform will allow the users to easily access their portfolio holding, cash value, and buying power as shown at 802. The GUI will allow the user to view the athletes via a watchlist set up by the user as shown at 804. In an embodiment, the watchlist is set up automatically comprising all the athletes in the game or the league. The watchlist may comprise a sub tab where the leaderboard ranking changes dynamically based on the athlete's performance and the stock pricing. The system will allow the users to trade the stock at a specific value defined by a proprietary formula that calculates stock price live as the game is progressing. As defined earlier, the computational formula comprises AI and is implemented on blockchain technology to calculate the stock price in real-time. The system also allows the user to view and maintain their watchlist in real-time. All the athletes' stock values are calculated in real-time as the game progresses. The users are allowed to view further details or trade (sell or buy) as shown at 806. A highlight of the game, the game statistics, and a prediction of the athlete performance metrics can be fed into the GUI as shown at 808 according to an embodiment. According to an embodiment of the system, the stock price is dependent on the ranking of the athlete. According to an embodiment of the system, the system is configured for the user to trade the stock with one click. According to an embodiment of the system, the system is configured to allow the user to access portfolio holding, cash value, and buying power through an account of the user.

According to an embodiment of the system, the system is configured for the user to trade the stock at the stock price in real-time as the game is in progress. According to an embodiment of the system, the computation metric is implemented on blockchain technology to compute the stock price in real-time.

Figure 9:
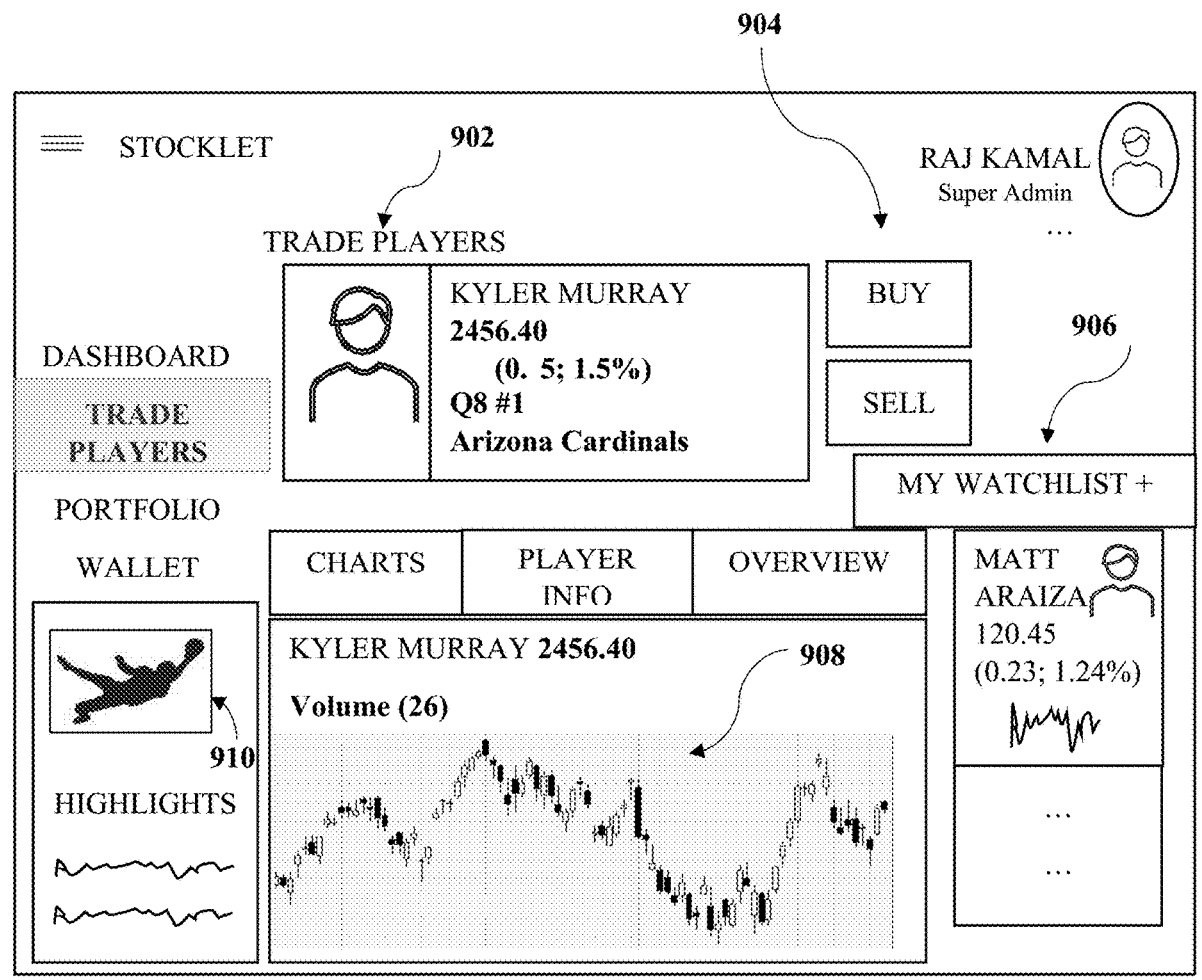
FIG. 9 shows the detailed view of an athlete where the stock price is changing in real-time while the game is in progress according to an embodiment.

FIG. 9 shows the detailed view of an athlete where the stock price is changing in real-time while the game is in progress according to an embodiment. A chosen athlete from the watchlist of the user can be viewed and followed in detailed view as shown at 902. The trades can be bought or sold as shown at 904 related to the athlete. The options of trading at a price that is desirable versus that as per market price is available under the sub-menus of the buy and sell option. The watch list as shown at 906 can comprise the users' preferred athletes. In an embodiment, there can be multiple watchlists that can be set up by the user. In another embodiment, the watchlist is dynamically changing with the ranking of the athletes. The watchlist may be formulated with all the athletes of the game. The dynamic stock price can be viewed as shown at 908. The view can be a candlestick view, market price, opening price, closing price, etc., based on the user settings. In an embodiment, the time frame shown at 908 can be changed from 1 minute to any length such as hours, days, weeks, months based on the view period which can be a day, 5 days, a month, a year, etc. A highlight of the game, the game statistics, and a prediction of the athlete performance metrics, key highlights of the athlete, athlete performance in the game, etc., can be fed into the GUI as shown at 910 according to an embodiment.

Cyber Security

In an embodiment, the system may comprise a cyber security module, a communication module, a server, and a database.

In one aspect, a secure communication management (SCM) computer device for providing secure data connections for the system is provided. The SCM computer device includes a processor in communication with memory.

According to an embodiment, secure authentication for data transmissions comprises, provisioning a hardware-based security engine (HSE) located in communications system, said HSE having been manufactured in a secure environment and certified in said secure environment as part of an approved network; performing asynchronous authentication, validation and encryption of data using said HSE, storing user permissions data and connection status data in an access control list used to define allowable data communications paths of said approved network, enabling communications of the communications system with other computing system subjects to said access control list, performing asynchronous validation and encryption of data using security engine including identifying a user device (UD) that incorporates credentials embodied in hardware using a hardware-based module provisioned with one or more security aspects for securing the system, security aspects comprising said hardware-based module communicating with a user of said user device and said HSE.

In an embodiment, a cyber security module is embedded in each layer of the system. Each layer represents a different stage in network communication, from a human typing on a keyboard to the data system used for applications. These layers are based on the Open Systems Interconnect (OSI) model and comprise a human layer, a perimeter layer, a network layer, an endpoint layer, an application layer, a data layer, and a mission critical layer of the system.

Figure 10A:
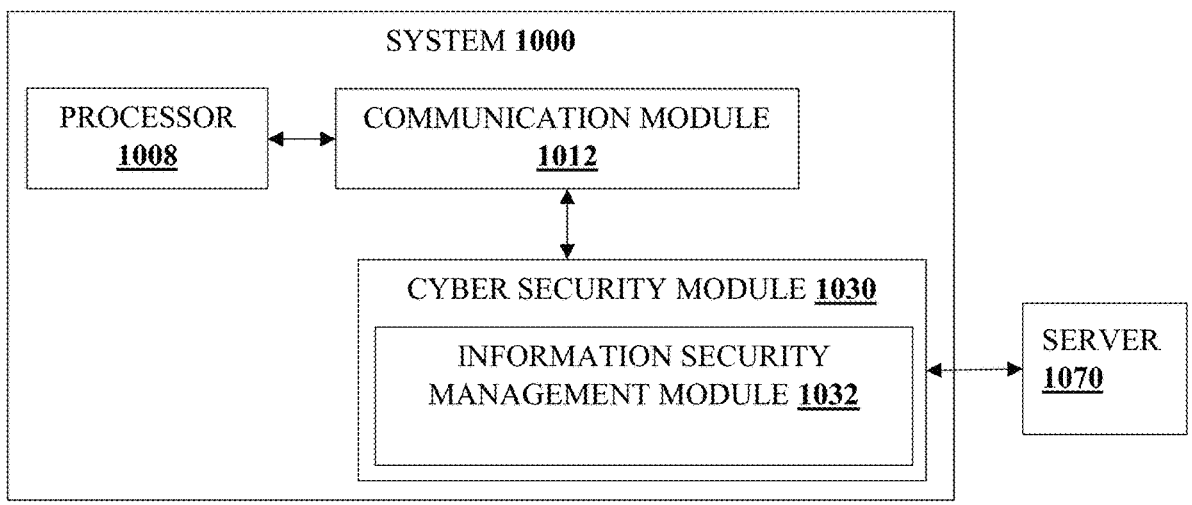
FIG. 10A shows a block diagram of the cyber security module in view of the system and server according to an embodiment.

In an embodiment, FIG. 10A shows the block diagram of the cyber security module. The communication of data between the system 1000 and the server 1070 through the communication module 1012 is first verified by the information security management module 1032 before being transmitted from the system to the server or from the server to the system. Processor 1008 is connected to the communication module 1012. The information security management module is operable to analyze the data for potential cyber security threats, to encrypt the data when no cyber security threat is detected, and to transmit the data encrypted to the system or the server.

Figure 10B:
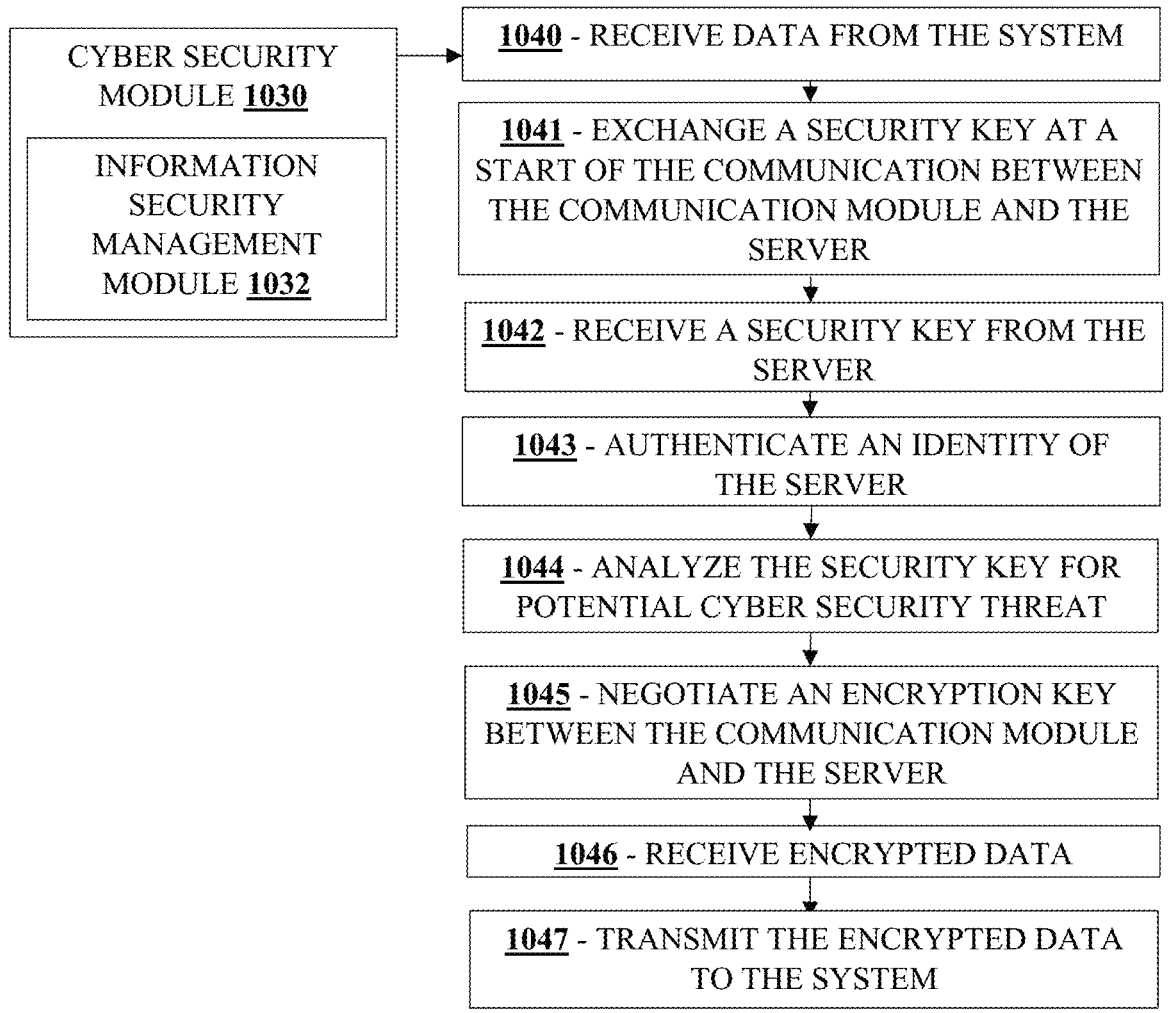
FIG. 10B shows an embodiment of the cyber security module according to an embodiment.

In an embodiment, the cyber security module further comprises an information security management module providing isolation between the system and the server. FIG. 10B shows the flowchart of securing the data through the cyber security module 1030. At step 1040, the information security management module is operable to receive data from the system, for example, at least one of a mobility vehicle, a virtual reality (VR) headset, an auxiliary system, and a database. At step 1041, the information security management module exchanges a security key at the start of the communication between the communication module and the server. At step 1042, the information security management module receives a security key from the server. At step 1043, the information security management module authenticates an identity of the server by verifying the security key. At step 1044, the information security management module analyzes the security key for potential cyber security threats. At step 1045, the information security management module negotiates an encryption key between the communication module and the server. At step 1046, the information security management module receives the encrypted data. At step 1047, the information security management module transmits the encrypted data to the server when no cyber security threat is detected.

Figure 10C:
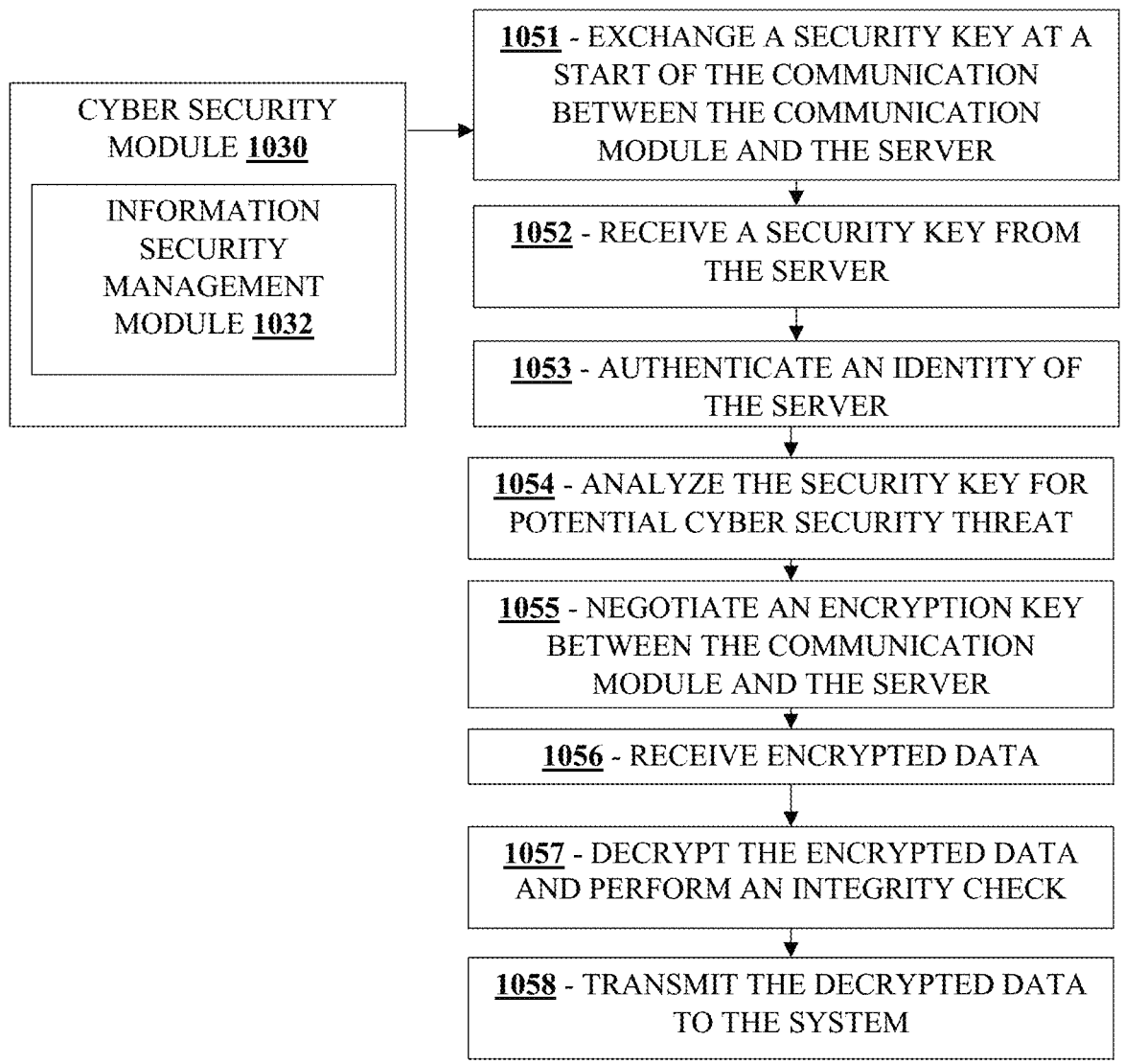
FIG. 10C shows another embodiment of the cyber security module according to an embodiment.

In an embodiment, FIG. 10C shows the flowchart of securing the data through the cyber security module 1030. At step 1051, the information security management module is operable to: exchange a security key at the start of the communication between the communication module and the server. At step 1052, the information security management module receives a security key from the server. At step 1053, the information security management module authenticates an identity of the server by verifying the security key. At step 1054, the information security management module analyzes the security key for potential cyber security threats. At step 1055, the information security management module negotiates an encryption key between the communication module and the server. At step 1056, the information security management module receives encrypted data. At step 1057, the information security management module decrypts the encrypted data, and performs an integrity check of the decrypted data. At step 1058, the information security management module transmits the decrypted data to the system, for example, at least one of a mobility vehicle, a VR headset, an auxiliary system, and a database through the communication module when no cyber security threat is detected.

In an embodiment, the integrity check is a hash-signature verification using a Secure Hash Algorithm 256 (SHA256) or a similar method. A cryptographic hash (sometimes called 'digest') is a kind of 'signature' for a text or a data file. SHA256 generates an almost-unique 256-bit (32-byte) signature for a text.

In an embodiment, the information security management module is configured to perform asynchronous authentication and validation of the communication between the communication module and the server.

In an embodiment, a perimeter network provides an extra layer of protection. In an embodiment, the perimeter network protects the system from a cyber security threat by using a plurality of firewalls. Usually, a perimeter network is the final step a packet takes traversing one of the system's networks on its way to the internet; and conversely the first network encountered by incoming traffic from the Internet to the system.

In an embodiment, a demilitarized zone (DMZ) network functions as a subnetwork containing an organization's exposed, outward-facing service. It acts as the exposed point to an untrusted network, commonly the Internet. A DMZ network will add an extra layer of security to an organization's local area network. It is a protected and monitored network node that faces outside the internal network and can access what is exposed in the DMZ, while the rest of the organization's network is safe behind a firewall. A DMZ Network gives organizations extra protection in detecting and mitigating security breaches before they reach the internal network, where valuable assets are stored. All services accessible to users when communicating from an external network can and should be placed in the DMZ, if one is used. The most common services include, but are not limited to, web servers, mail servers, file transfer protocol (FTP) servers.

In an embodiment, the information security management module is configured to raise an alarm if a cyber security threat is detected. In an embodiment, the information security management module is configured to discard the encrypted data received if the integrity check of the encrypted data fails.

In an embodiment, the information security management module is configured to check the integrity of the decrypted data by checking accuracy, consistency, and any possible data loss during the communication through the communication module.

In an embodiment, the server is physically isolated from the system through the information security management module. When the system communicates with the server as shown in FIG. 10A, identity authentication is first carried out on the system and the server. The system is responsible for communicating/exchanging a public key of the system and a signature of the public key with the server. The public key of the system and the signature of the public key are sent to the information security management module. The information security management module decrypts the signature and verifies whether the decrypted public key is consistent with the received original public key or not. If the decrypted public key is verified, the identity authentication is passed. Similarly, the system and the server carry out identity authentication on the information security management module. After the identity authentication is passed on to the information security management module, the two communication parties, the system, and the server, negotiate an encryption key and an integrity check key for data communication of the two communication parties through the authenticated asymmetric key. A session ID number is transmitted in the identity authentication process, so that the key needs to be bound with the session ID number; when the system sends data to the outside, the information security gateway receives the data through the communication module, performs integrity authentication on the data, then encrypts the data through a negotiated secret key, and finally transmits the data to the server through the communication module. When the information security management module receives data through the communication module, the data is decrypted first, integrity verification is carried out on the data after decryption, and if verification is passed, the data is sent out through the communication module; otherwise, the data is discarded.

In an embodiment, the identity authentication is realized by adopting an asymmetric key with a signature.

In an embodiment, the signature is realized by a pair of asymmetric keys which are trusted by the information security management module and the system, the private key is used for signing the identities of the two communication parties, and the public key is used for verifying that the identities of the two communication parties are signed. Signing identity comprises a public and a private key pair. In other words, signing identity is referred to as the common name of the certificates which are installed in the user's machine.

In an embodiment, both communication parties need to authenticate their own identities through a pair of asymmetric keys, and a task in charge of communication with the information security management module of the system is identified by a unique pair of asymmetric keys.

In an embodiment, the dynamic negotiation key is encrypted by adopting an Rivest-Shamir-Adleman (RSA) encryption algorithm. RSA is a public-key cryptosystem that is widely used for secure data transmission. The negotiated keys include a data encryption key and a data integrity check key.

In an embodiment, the data encryption method is a Triple Data Encryption Algorithm (3DES) encryption algorithm. The integrity check algorithm is a Hash-based Message Authentication Code (HMAC-MD5-128) algorithm. When data is output, the integrity check calculation is carried out on the data, the calculated Message Authentication Code (MAC) value is added with the header of the value data message, then the data (including the MAC of the header) is encrypted by using a 3DES algorithm, the header information of a security layer is added after the data is encrypted, and then the data is sent to the next layer for processing. In an embodiment the next layer refers to a transport layer in the Transmission Control Protocol/Internet Protocol (TCP/IP) model.

In an embodiment, when the receiving side finds an authentication error or a MAC decryption error, it is necessary to send a fatal error message to the transmitting side and close the connection.

The information security management module ensures the safety, reliability, and confidentiality of the communication between the system and the server through the identity authentication when the communication between the two communication parties starts the data encryption and the data integrity authentication. The method is particularly suitable for an embedded platform which has less resources and is not connected with a Public Key Infrastructure (PKI) system and can ensure that the safety of the data on the server cannot be compromised by a hacker attack under the condition of the Internet by ensuring the safety and reliability of the communication between the system and the server.

In an embodiment, a system hardening strategy is implemented to prevent at least one attack. An attack graph analysis may be used to help analyze network vulnerability. Once an attack graph of conditions and/or exploits (e.g., at least one goal condition, at least one initial condition, at least one exploit) is obtained, allowable actions that may harden the conditions may be obtained. Costs associated with the allowable actions may also be obtained. Recommended actions to harden the network with respect to one or more goal conditions may be determined.

Figure 11:
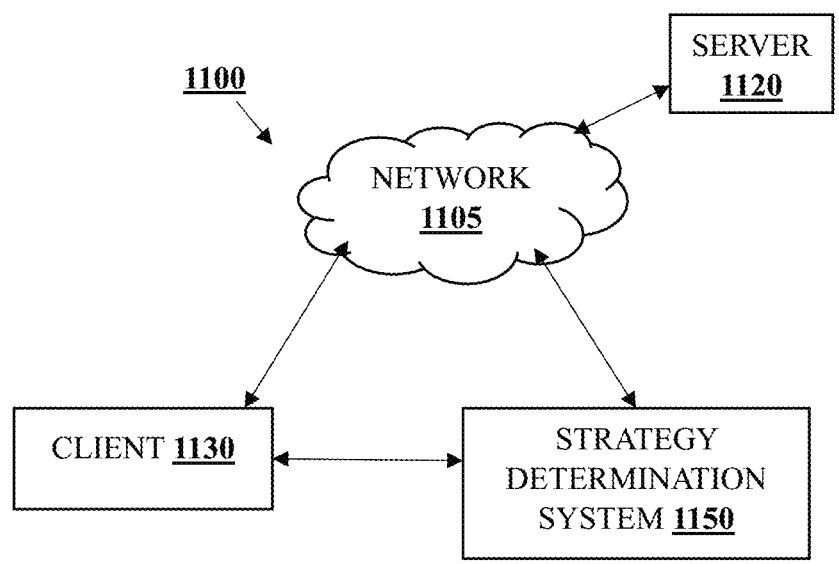
FIG. 11 shows an example implementation of a system hardening strategy according to an embodiment of the invention.

FIG. 11 is a system 1100 according to an embodiment of the invention. In this example, the system 1100 may comprise a network 1105 (e.g., the Internet, an intranet) wherein one or more computers (e.g., server 1120, client 1130) may communicate with one another. A strategy determination system 1150 may communicate with the client and/or the server. The strategy determination system 1150 may obtain an attack graph of conditions and/or exploits (e.g., using known techniques), obtain allowable actions that may remove one or more initial conditions to harden the network with respect to one or more goal conditions; obtain costs associated with the allowable actions; and determine recommended system hardening strategies to efficiently harden the network with respect to the goal condition(s), each system hardening strategy consisting of one or multiple allowable actions. Attackers may leverage complex interdependencies of network configurations and vulnerabilities to penetrate seemingly well-guarded networks. In an embodiment, the recommended actions may consider attacker exploits in isolation and/or in combination. Attack graphs may reveal such threats by enumerating potential paths that attackers can take to penetrate networks which may help determine whether a given set of system hardening measures provides safety for given critical resources.

System hardening goal conditions may have a corresponding impact on removing paths in the attack graph. In addition, system hardening solutions that are optimal with respect to some notion of cost and/or time may be determined. Such system hardening solutions may prevent the attack from succeeding, while minimizing the associated costs.

The strategy determination system 1150 may comprise: a determine allowable actions module; an associate costs module; a determined recommended actions module; an approximation module; or any combination thereof. In the strategy determination method, an attack graph comprising conditions and/or exploits may be obtained, allowable actions that remove one or more initial conditions may be obtained, costs associated with the allowable actions may be obtained, and recommended strategies comprising allowable actions may be determined based upon costs and/or time constraints.

Spyware is a type of malware that may be installed on computers which collects bits of information about users without their knowledge. The presence of spyware is typically hidden from the user and may be difficult to detect. Spyware programs may collect various types of personal information such as internet surfing habits and sites that have been visited. Spyware programs may also interfere with user control of the computer in other ways, such as installing additional software and redirecting web browser activity.

Figure 12:
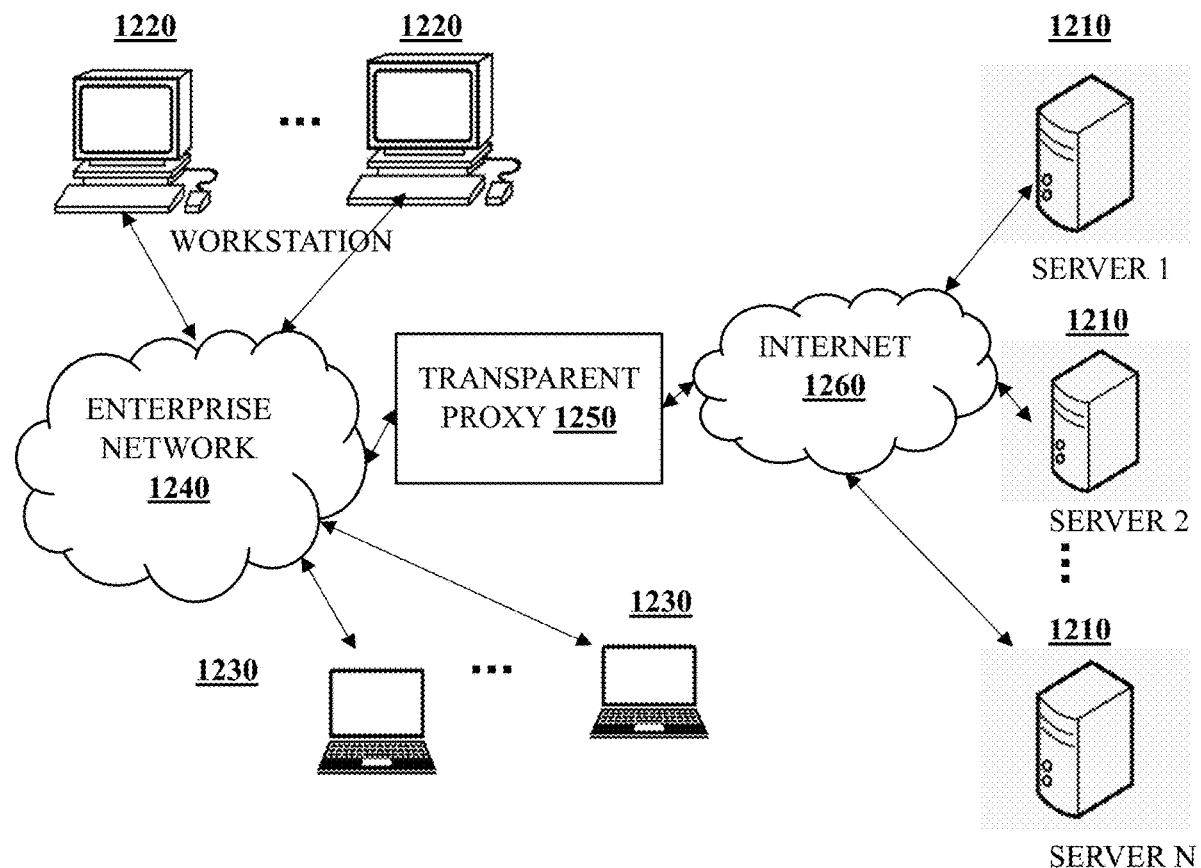
FIG. 12 shows an architecture of a network using a transparent proxy in an Enterprise network as per an aspect of an embodiment of the present invention for active malware detection.

Passive detection may identify a fraction of the malware that is collected in an enterprise network but may not identify all of them. Embodiments of the present invention utilize active detection mechanism(s). The active detection mechanism(s) may also be called Active Content Challenges and may be implemented using a transparent proxy. FIG. 12 shows the architecture of a network using an embodiment of the transparent proxy 1250 in an Enterprise network 1240 including workstations 1220 and laptops 1230. The architecture may be fully transparent and may not require any application or network modifications for client applications and for servers and may accommodate various protocols including HTTP, encrypted HTTP (HTTPS) and Voice over IP (VOIP) protocols. The transparent proxy 1250 may mediate all traffic both encrypted and unencrypted when an application initiates a communication with a server 1210 connected to an Internet 1260 outside the enterprise. Communication may pass through the firewall while being examined and analyzed by the transparent proxy 1250. According to an embodiment, a transparent proxy may be in a laptop or workstation. The transparent proxy may mediate all traffic both encrypted and unencrypted when an application initiates a communication with a remote server connected to the internet.

The transparent proxy 1250 may intercept outbound requests and issue Active Content Challenges to the requesting application. The principle is similar to Turing puzzles and Captchas, however, rather than trying to distinguish a human from software, the objective is to distinguish legitimate software from malware. Thus, unlike existing mechanisms that demand end-users to be involved in the identification process by solving a puzzle, the approach in this embodiment requires no user involvement or application modification. The transparent proxy for malware detection may include a monitor module, a protocol determination module, a challenge generation module, a response determination module, and a data control module. The transparent proxy may include interfaces for receiving and transmitting applications traffic and remote server traffic. The transparent proxy may be located on a network edge or on a laptop or workstation and may examine outgoing traffic. In general, the approach frustrates the communication of the malware by injecting traffic that the malware is incapable of parsing and incapable of generating a valid response contrary to the legitimate application.

In an embodiment, a secure virtual browsing environment is provided which includes creating a virtual browsing environment with a virtualized operating system sharing an operating system kernel of a supporting operating system and executing the browser application within the virtual browsing environment. Another embodiment includes receiving a website selection within a browser application, determining if the website selection corresponds to a secure bookmark, and creating a second virtual browsing environment and executing the browser application within the second virtual browsing environment to access the website selection when the website selection corresponds to a website specified as a secure bookmark. Another embodiment includes monitoring operations of the operating system within at least one virtual browsing environment, determining when the operation of the operating system includes potential malicious activity, and terminating the virtual browsing environment when the operation includes potential malicious activity.

Figure 13A:
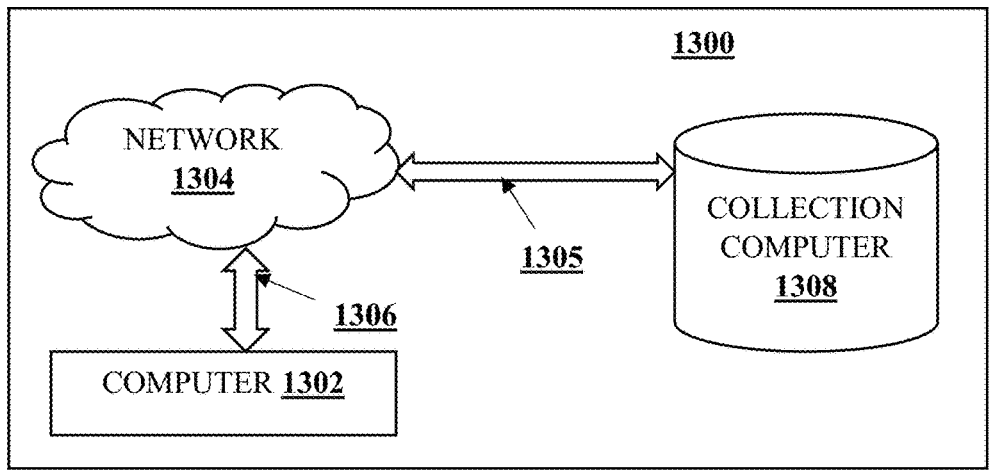
FIG. 13A illustrates a system for providing a virtual browsing environment according to an aspect of an embodiment of the invention.

FIG. 13A illustrates a system 1300 for providing a virtual browsing environment according to an embodiment of the invention. As described below, embodiments of the system 1300 may provide a virtual browsing environment for executing a browser application on a computer. By executing the browser application within a separate virtual browsing environment, other applications, data, and modules of the computer may be protected from any malicious activity associated with the execution of the browser application. In addition, because in some embodiments only the browser application may be executed within the virtual browsing environment, malicious activity associated with the execution of the browser application may be easily detected. The system 1300 may include at least one computer 1302, at least one network 1304, and at least one collection computer ("CC") 1308, and other components. The computer 1302 and the network 1304 may be connected by a connection 1306, and the network 1304 and the collection computer 1308 may be connected by a connection 1305. The collection computer 1308 may receive data from the network 1304 over the connection 1305. In some embodiments, the collection computer 1308 may also send data to the network 1304 or one or more computers or networks. The collection computer 1308 may also include hardware, such as one or more memory modules, one or more processors, and one or more input/output modules. In addition, the collection computer 1308 may include an operating system to manage the hardware. In some embodiments, the collection computer 1308 may also include a database that stores data received from the network 1304. The data included in the database may be stored in the collection computer's 1308 one or more memory modules, and the data may be managed by a database management application.

Figure 13B:
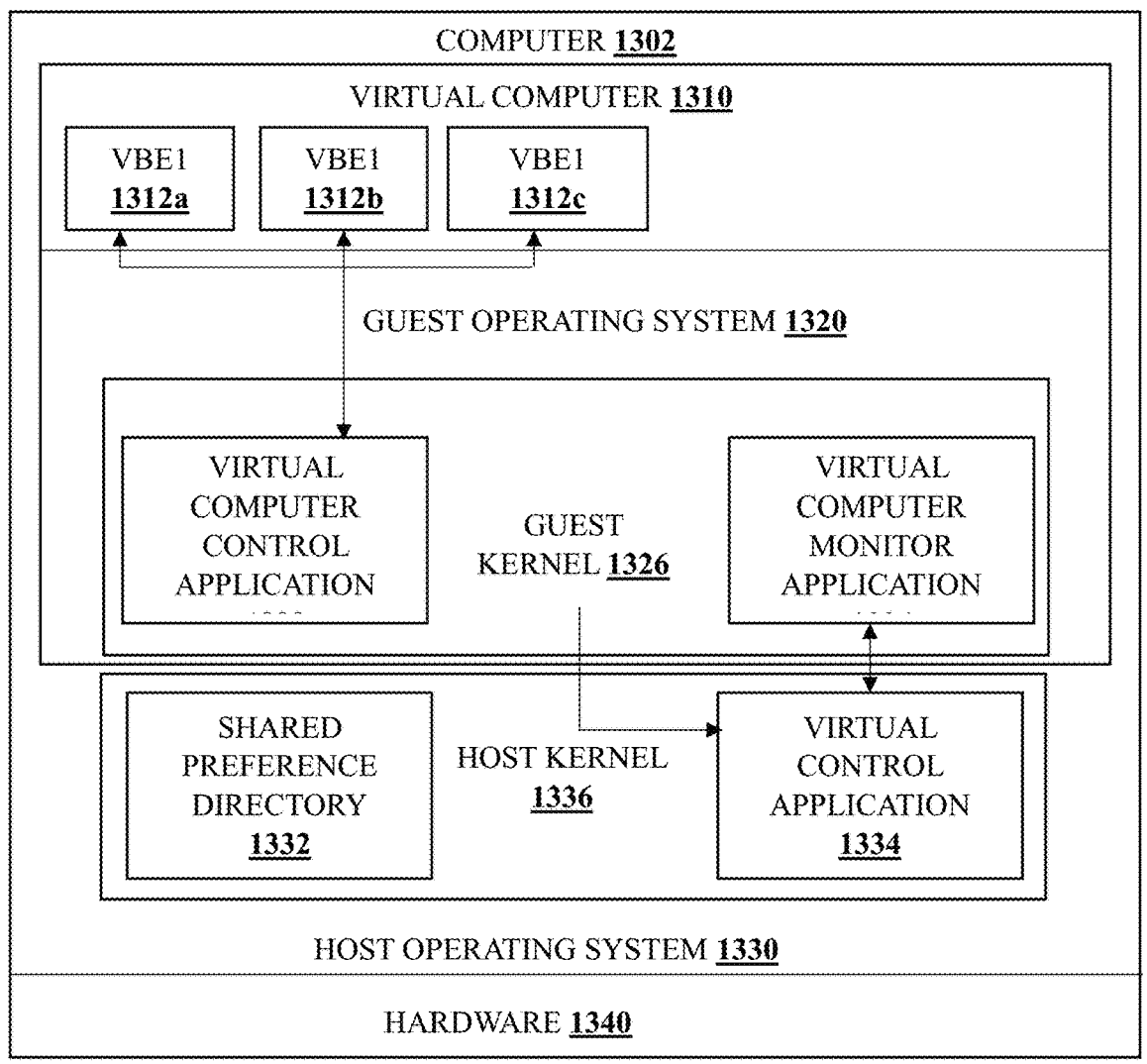
FIG. 13B illustrates a computer included in the system of FIG. 13A, according to an embodiment of the invention.

FIG. 13B illustrates the computer 1302 of FIG. 13A which includes a host operating system 1330 that provides an interface between the hardware 1340 and a user operating the computer 1302. The host operating system 1330 may be stored in the one or more memory modules and may be executed on the one or more processors included in the hardware 1340. The host operating system 1330 may include at least one host kernel 1336. The host kernel 1336 may manage the communication between the hardware 1340 and applications executed by the hardware 1340. The host kernel 1336 may use the virtual control application (VCA) 1334 to create and manage a virtual computer. Accordingly, the VCA 1334 may provide virtualization functionality. The host kernel 1336 may also include a shared preference directory 1332, which may store preferences for an application, such as a browser application. It should be understood that the one or more memory modules included in the hardware 1340 may store other applications besides those explicitly shown in FIG. 13B. In addition, the functionality provided by the applications stored in the one or more memory modules may be combined and distributed in various configurations.

In operation, as shown in FIG. 13B, the host kernel 1336 may execute the VCA 1334 to create a virtual computer 1310. The virtual computer 1310 may include its own guest host operating system 1320 with a guest kernel 1326. The guest operating system 1320 and guest kernel 1326 may operate similarly to the host operating system 1330 and host kernel 1336. This type of virtualization, where a generally complete copy of an operating system is provided within a virtual computer, is generally referred to as "full virtualization." Outside of the virtual computer 1310, the host operating system 1330 may continue to interact and manage the hardware 1340, while the guest operating system 1320 also may interact and manage the hardware 1340. Therefore, the virtual computer 1310 may create a second, isolated computing environment within the computer 1302. Each computing environment may execute different applications, access data from different locations in a memory module or from different memory modules, provide different operating systems, or combinations thereof. Creating the virtual computer 1310 may provide isolation between computing performed within the virtual computer 1310 and computing performed outside the virtual computer 1310 through the host operating system 1330. For example, the virtual computer 1310 may be unaware of any computing performed outside of the virtual computer 1310. Accordingly, an application executed within the virtual computer 1310 cannot generally access an application executed outside the virtual computer 1310.

As shown in FIG. 13B, the guest kernel 1326 may include a virtual computer control application ("VCCA") 1322 and a virtual computer monitor application ("VCMA") 1324. The VCCA 1322 may manage the operation of the virtual computer 1310. For example, as shown in FIG. 13B, the VCCA 1322 may create one or more virtual browsing environments ("VBE") 1312 (e.g., VBE 1 1312 *a*, VBE 2 1312 *b*, and VBE 3 1312 *c*). Once created, the VCMA 1324 may monitor the operation of each VBE 1312 and may report each VBE's operation to the VCA 1334. To create a VBE 1312, the VCCA 1322 may use one or more virtualization modules or applications, such as OpenVZ, UnionFS patches, Solaris Zones, BSD Jail, or combinations thereof.

It is known that internet-enabled applications run side-by-side with all other desktop and system software user privileges. As a result, when a compromise occurs through the Internet, the entire system can be compromised by a single vulnerability in Internet-enabled software such as a Web browser or an email client. By simply browsing to a Web page, a user can compromise their system, sometimes irreversibly.

In an embodiment, the system works by launching a virtual machine for each Internet-enabled or untrusted application that is started. The virtual machine provides a pristine guest operating system (OS) for the Internet-enabled or untrusted application that is launched. This operating system may be an operating system unmodified from the original version delivered by the manufacturer or another version suitably configured for the task of running intended applications. The virtual machine and its guest operating system may be temporally limited to exist only for the duration of the session of the application. When the user exits the application, the virtual machine can be destroyed. For the duration of the session, the virtual machine provides an isolated environment from the host machine from which it is launched. The virtual machine provides a level of isolation from the host machine that is equivalent to running a physically separate machine from the host machine. Any attacks that occur on the machine via an Internet connection can compromise only the virtual machine that is started up for that session. When the session is terminated, so is the virtual machine and the compromise. With each new session, a pristine new virtual machine is started up, meaning that any malicious software that was downloaded or planted during a prior session is no longer present. The underlying host operating system does not need to maintain an Internet connection. As a result, Internet-based attacks have a very limited ability to compromise the host operating system.

Figure 14:
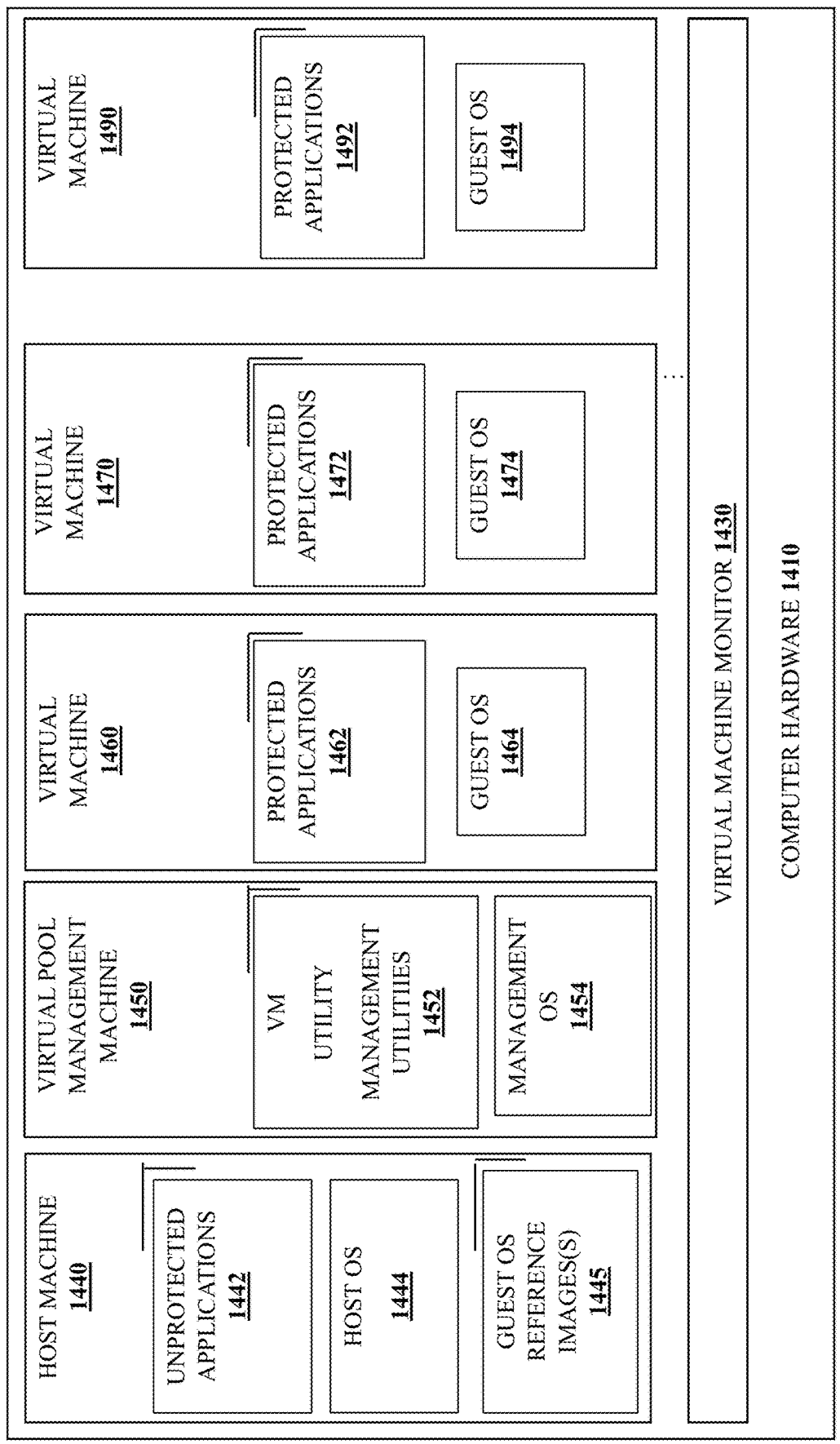
FIG. 14 is a block diagram of a virtual machine architecture of an aspect of an embodiment of the present invention for preventing malicious software attacks.

According to an embodiment, an architecture shown in FIG. 14 uses the standard virtual machine architecture with the Virtual Machine Monitor (VMM) 1430 running on the computer hardware 1410, and host operating systems (1444) running on top of the VMM 1430. A host operating system (OS) 1444 is defined as the default machine the user normally uses and is the machine whose desktop is presented to the user. Guest OSs (1464, 1474 and 1494) are created by request when a protected application (1462, 1472 and 1492) is launched, or created in advance to enable higher performance when launching protected applications (1462, 1472 and 1492) into pre-instantiated guest OSs (1464, 1474 and 1494). A Virtual Pool Management Machine (VPMM) 1450 may be bootstrapped along with the Host OS 1444 and a reference guest OS image 1445 that is used for clones of the guest OS reference image 1445. The Virtual Pool Management Machine 1450 is used for command, control, and lifecycle maintenance of the guest OSs (1464, 1474 and 1494) based on the instructions from the host OS 1444. The number of guests instantiated Operating Systems may be dependent on the number of protected applications launched and the performance limits of the underlying hardware. The VMM 1430 and VPMM 1450 should support live capture of the full system state in a file for subsequent replay. This file is called a "snapshot" of the system state.

The host operating system 1444 may be configured for higher security so that it is unable to make Internet connections itself. The guest operating systems (1464, 1474 and 1494) may be free to make direct Internet connections; however, they should be restricted from freely accessing the host operating system 1444 by the virtual machine monitor 1430 that runs in its own hardware protection domain which provides hardware-equivalent strong isolation between the virtual machine and its host operating system. The guest operating systems (1464, 1474 and 1494), which are pristine builds of the OS, should also be "root secure", which means that even if one of the guest operating systems (1464, 1474 and 1494) is compromised to a root user level or the kernel itself is compromised, the host operating system 1444 itself should not be compromised by the compromised guest operating system. Once a guest operating system is destroyed (upon closure of the protected application that started the guest OS), the compromise is now removed from the system.

As mentioned earlier, a reference guest OS image 1445 may be booted along with the host OS 1444. A snapshot of the reference guest OS image 1445 may be taken, then used to derive subsequent virtual machine (VM) images by cloning it, i.e., creating a replica image of the reference guest OS. When a new untrusted application is to be started, a dispatch instruction is sent from the Host OS to the Virtual Pool Management Machine 1450, which then creates a VM for the application using the reference guest OS image, if the VM has not already been created. By cloning and pre-booting reference images, the response time for instantiating the application should be on par or even faster than the usual response time for starting a new application for users.

As described, FIG. 14 shows an embodiment of the present invention where a virtual machine monitor (VMM) 1430 runs directly on computer hardware 1410. In this embodiment, every host machine (1440,) is essentially a guest machine to the computer hardware. In this setup, the unprotected host applications 1442 run on the host machine 1440 natively and the host operating system 1444 runs these unprotected host applications 1442. In contrast, the guest virtual machines 1460, 1470 and 1490 run protected applications (1462, 1472, and 1492 respectively) that may talk to a network under guest operating systems (1464, 1474 and 1494 respectively).

The guest operating systems 1464, 1474, and 1494 are each cloned from one of the guest operating system images (s) 1445. The images 1445 should be pristine snapshots of a running operating system. To increase speed, the snapshots may also include running applications. For example, an image 1445 of an operating system for an email virtual machine can include a copy of an email application running under the operating system.

The virtual pool management machine 1450 runs a series of virtual machine management utilities 1452 under a management operating system 1454. These virtual machine management utilities 1452 include functions that: create, destroy, put to sleep, and wake up virtual machines. The utilities also maintain a list that matches applications to virtual machines. In other embodiments, these same functions may be performed by pool management utilities running on a host machine.

Figure 15:
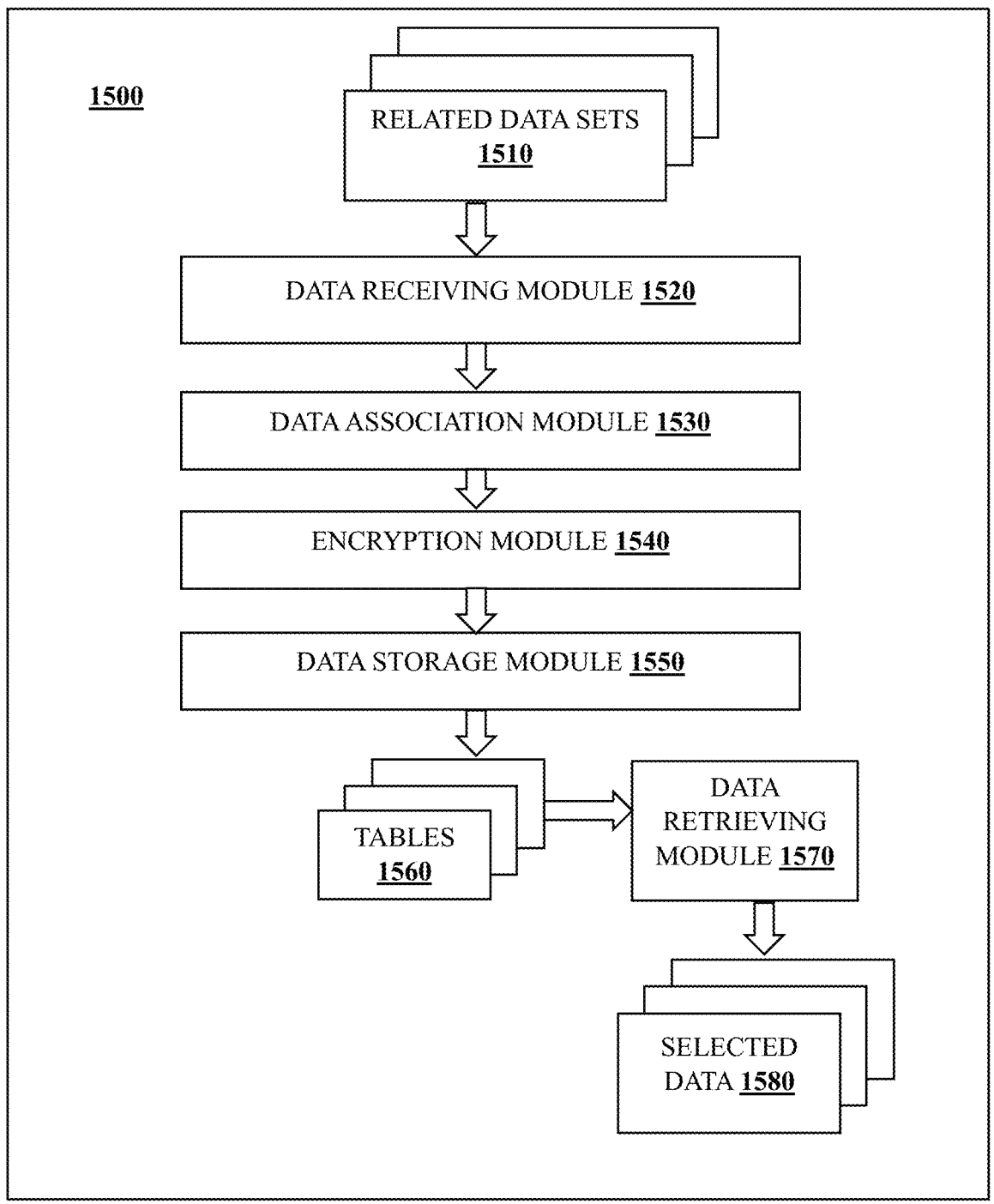
FIG. 15 is a block diagram for securing sensitive data associations for related data values of an aspect of an embodiment of the present invention.

In an embodiment, sensitive data associations for related data values are protected. FIG. 15 is a block diagram of a system 1500 for protecting sensitive data associations according to an aspect of an embodiment of the present invention. The block diagram shows a multitude of modules. As shown, the system includes a data receiving module 1520 configured to receive a set(s) of related data values 1510. The set(s) of related data values 1510 preferably including at least a first data value and a second data value. The system normally operates using rule(s) that indicate which data value associations need to be kept secret. In the absence of such a rule, a custom rule such as the association of the first data value and the second data value needs to be kept secret may be used.

A data association module 1530 may be configured to associate the first data value to a first data field; and the second data value to a second data field. An encryption module 1540 may then create a first encrypted data by encrypting the first data value using a first encryption key; and then create second encrypted data by encrypting the second data value using a second encryption key. A data storage module 1550 is configured to store: the first data value in a first data table 1560; the second data value in a second data table 1560; the first encrypted data in the second table 1560; and the second encrypted data in the first table 1560.

A data retrieving module(s) 1570 may be used to retrieve: the first data value by decrypting the first encrypted data using a first decryption key and/or the second data value by decrypting the second encrypted data using a second decryption key. There are many possibilities for encryption and decryption keys. The encryption key and the decryption key may be the same symmetric key. The encryption keys may be different or the same. Similarly, the decryption keys may be the same or different. The choice of keys should be made carefully to ensure that the data relationships in the rule(s) are kept secret. In some embodiments, the rule may be received from an external source. In the absence of an external rule, an internal rule or a default rule may be used. Selected data is shown at 1580.

In an embodiment, $LH^*_{RE}$ is a tool for storing data records that is scalable and that allows a user to define their encryption and relieves a user from the task of managing keys used for data security. In an embodiment, application data and associated encryption key(s) are stored on at least k+1 remote servers using Linear Hashing (LH*) addressing. Linear hashing (LH) is a dynamic data structure which implements a hash table and grows or shrinks one bucket at a time. LH* generalizes Linear Hashing to parallel or distributed. At least k+1 buckets are created on separate remote servers. At least k+1 key shares are generated for each of the encryption keys. Each encryption key has a unique key number. Each key share is stored in a different key share record. Each of the key share records is stored in a different bucket using LH* addressing. Encrypted application data is generated by encrypting the application data with the encryption key(s). The encrypted application data is stored in encrypted data record(s). Each of the encrypted data records is stored in a different bucket among the buckets using LH* addressing.

Figure 16:
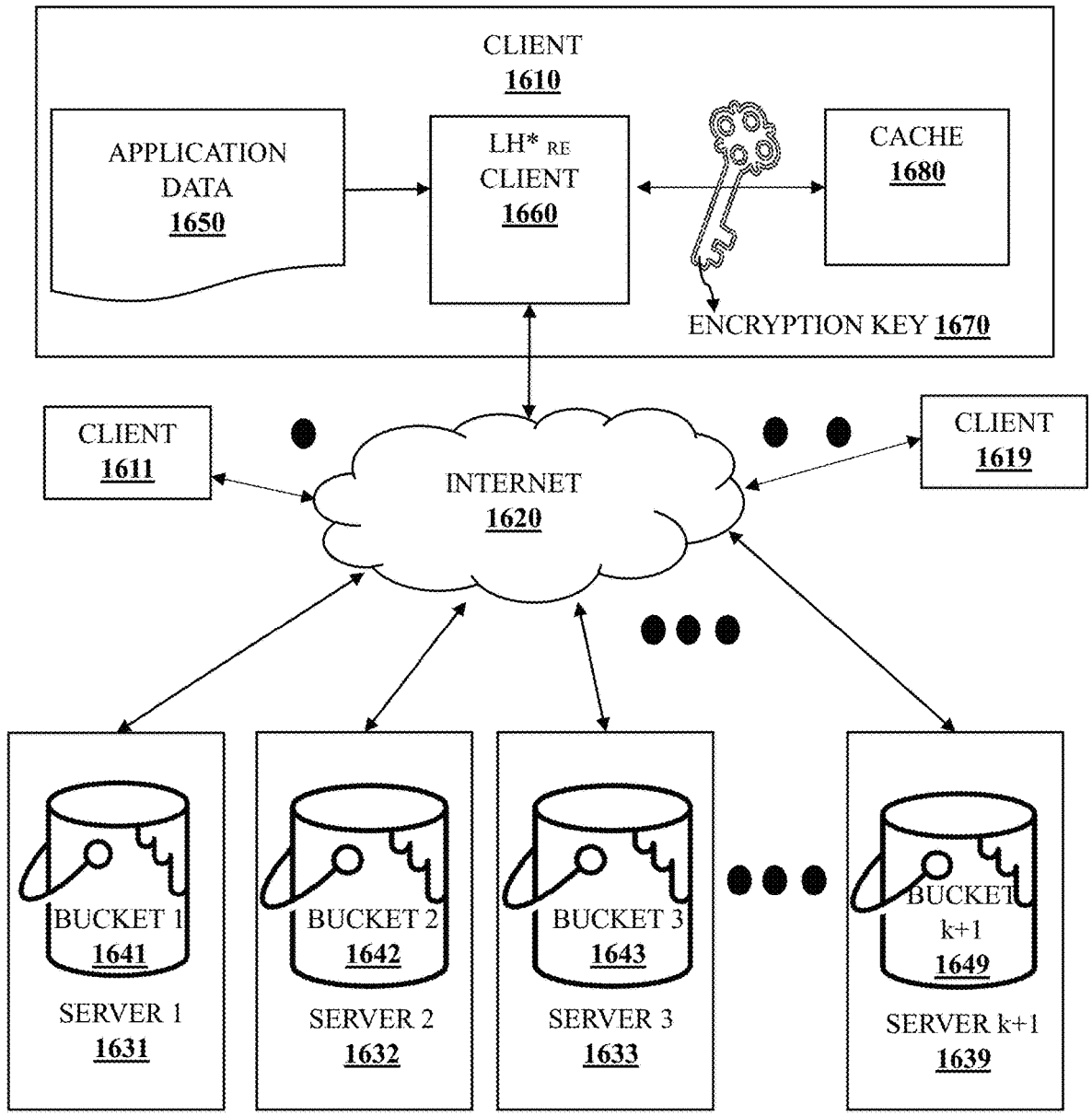
FIG. 16 is a system block diagram showing an example client interacting with k+1 servers that allows a user to define their encryption and relieves a user from the task of managing keys used for data security, as per an aspect of an embodiment of the present invention.

FIG. 16 is a system block diagram showing an example client 1610 interacting with k+1 remote servers (1631, 1632, 1633, . . . 1639) as per an aspect of an embodiment of the present invention. In these embodiments, one or more of clients (1610, 1611, . . . 1619) may have an $LH^*_{RE}$ client 1660 configured to store a version of application data 1650 encrypted with an encryption key 1670 on remote servers (1631, 1632, 1633, . . . 1639). $LH^*_{RE}$ is a Scalable Distributed Data Structure (SDDS) that stores many records protected through key encryption in a scalable file. A cache in the client 1610 is shown at 1680. As often, key management and in particular, preventing the loss of keys is of utmost importance. $LH^*_{RE}$ is an LH*-scheme that stores records on behalf of clients on any number of servers addressed through the scalable distributed hashing of record identifiers. The remote servers (1631, 1632, 1633, . . . 1639) will likely be specialized servers configured to communicate with many client systems (1610, 1611 . . . 1619) and manage data buckets (1641, 1642, 1643, . . . 1649). The remote servers (1631, 1632, 1633, . . . 1639) may be geographically diverse. Some of the remote servers (1631, 1632, 1633, . . . 1639)

may also be under the control of various organizations. In this way, the stored data may become harder for a third party to locate and retrieve all of the stored application data 1650 and key(s) 1670 from the data. Embodiments of the LH*$_{RE}$ client 1660 may be implemented as a computer readable storage medium containing a series of instructions that when executed by one or more processors on clients (1610, 1611, . . . 1619), causes the one or more processors to store application data 1650 on at least k+1 remote servers (1631, 1632, 1633, . . . 1639). In these embodiments, k is a freely set parameter of the system.

Figure 17:
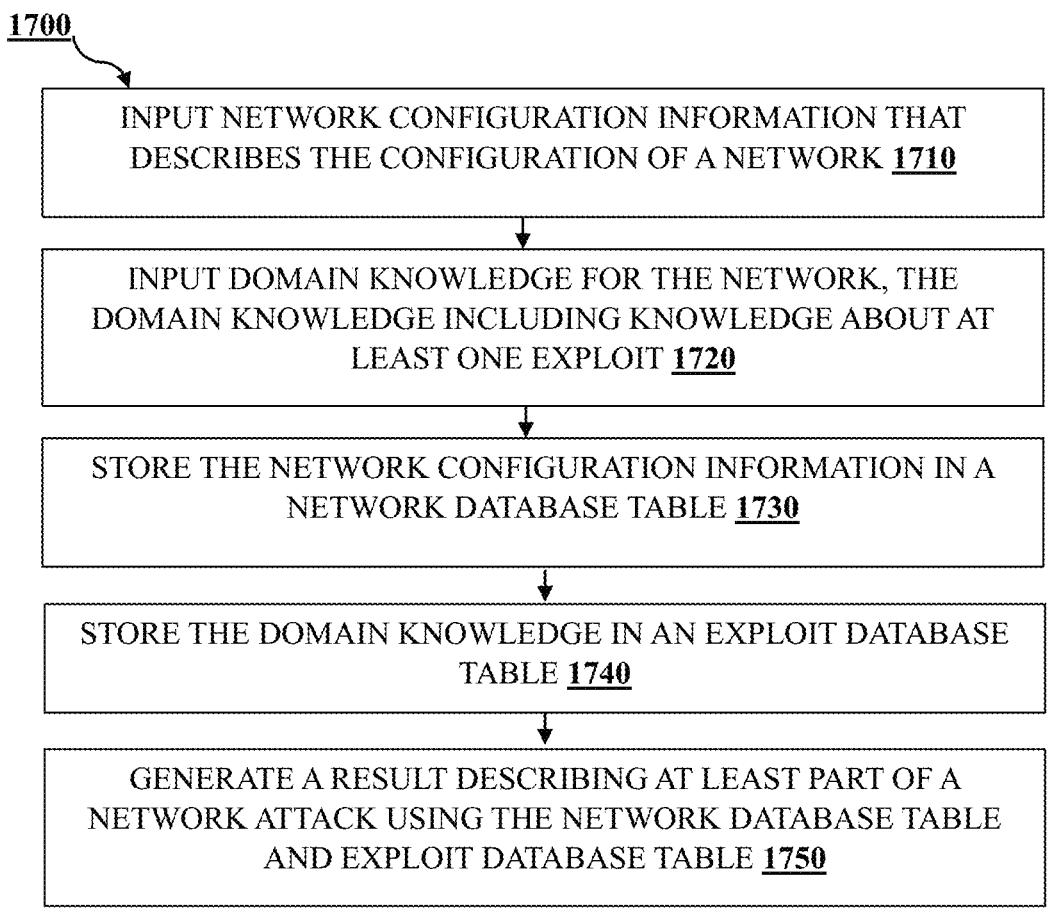
FIG. 17 is a flow diagram describing a method for determining at least part of a network attack according to an embodiment of the present invention.

Attack graphs depict ways in which an adversary exploits system vulnerabilities in a network such as a computer network. Attack graphs may be important in defending against well-orchestrated network intrusions. FIG. 17 is a flow diagram of an aspect of an embodiment where the network configuration information input module is preferably configured to input network configuration information that describes the configuration of a network 1710. The domain knowledge input module is preferably configured to input domain knowledge of the network 1720. Domain knowledge may include knowledge about various exploits in the network. The network configuration information storage module is preferably configured to store network configuration information in at least one network database table 1730. Similarly, the domain knowledge storage module is preferably configured to store the domain knowledge in at least one exploit database table 1740. The result generation module is preferably configured to generate a result using the network database table and exploit database table 1750. The result may be generated in many ways. For example, a network database table and an exploit database table could be used to generate another table that describes a complete attack graph. An attack graph is a graph that shows attack paths. An attack path may include a chain of exploits where each exploit lays the groundwork for subsequent exploits. A result may be generated in response to a query to a database management system that has access to the network database table and exploit the database table.

In an embodiment, an Intrusion Detection System (IDS) is deployed on the system. An IDS is software and/or hardware designed to detect unwanted attempts at accessing, manipulating, and/or disabling computer systems, mainly through a network, such as the Internet. An intrusion detection system is used to detect malicious behaviors that can compromise the security of networked computer systems. An IDS may include Sensor(s) that are deployed at strategic locations in the network, which monitor traffic at the sensor location and generate security events upon detection of malicious behaviors; A central engine records events (e.g., in a database) logged by the sensors; and console(s) to monitor events and control the sensors. In some IDS implementations, all three components (central engine, consoles, sensors) are combined in a single device or appliance. In a true distributed system, numerous sensors are deployed at various points in the network, which communicate over secure channels to the central engine. Multiple consoles may then interact with the central engine. In network-based intrusion detection systems (NIDS), sensors are located at monitoring points in a network. Traditionally, sensors may be placed at network borders or in a network demilitarized zone (DMZ), with the assumption that attacks are launched from outside the network to be defended. The sensor monitors network traffic at its point of deployment and analyzes the traffic content for patterns of malicious behavior.

Embodiments of the present invention locate the placement of intrusion detection system (IDS) sensors and prioritize IDS alerts using attack graph analysis. One embodiment predicts multiple ways of penetrating a network to reach critical assets. The set of such paths through the network constitutes an attack graph, which may be aggregated according to underlying network regularities to reduce the complexity of analysis. By knowing the paths of vulnerability through the networks, one may reduce the impact of attacks. IDS sensors may be placed to cover the attack graph, using a minimal number of sensors. This should minimize the cost of sensors, including the efforts of deploying, configuring, and maintaining them, while maintaining complete coverage of potential attack paths. An embodiment addresses the sensor placement as an instance of the non-deterministic polynomial-time (NP) hard minimal set cover problem using an efficient greedy algorithm. Once sensors are deployed and alerts are raised, a predictive attack graph may be used to prioritize alerts based on the attack graph distance to critical assets.

Figure 18:
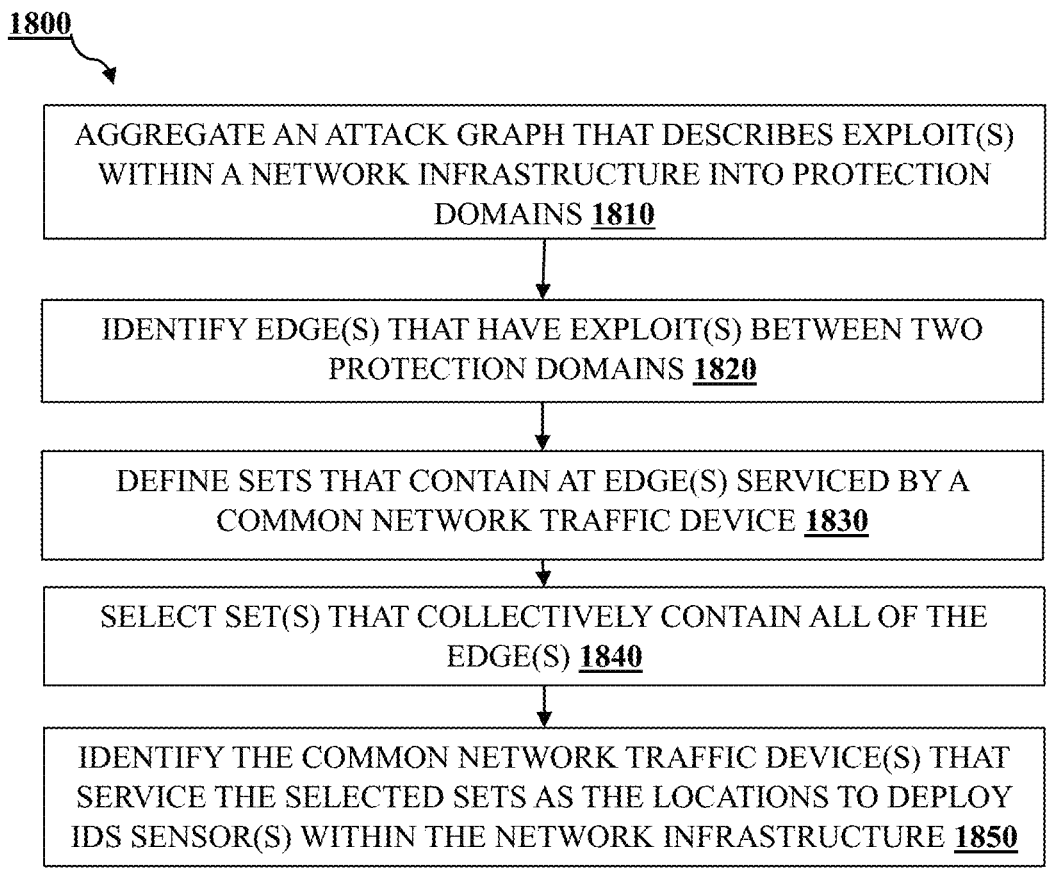
FIG. 18 depicts a flow diagram for a computer readable storage medium demonstrating instructions that cause the processor to perform a method for identifying locations to deploy intrusion detection system (IDS) sensors within a network infrastructure, as per an aspect of an embodiment of the present invention.

An embodiment of the present invention, as exemplified in FIG. 18, is a computer readable storage medium that contains instructions that when executed by at least one processor, causes the processor(s) to perform a method 1800 for identifying locations to deploy IDS sensor(s) within a network infrastructure. The method 1800 for identifying locations to deploy IDS sensor(s) within a network may comprise aggregating an attack graph that describes exploit(s) within a network infrastructure into protection domains 1810. The attack graph may be configured to describe exploit(s) in at least a part of the network infrastructure. Further, the embodiment may include identifying edge(s) that have exploit(s) between two protection domains 1820, defining sets that contain edge(s) serviced by a common network traffic device 1830, selecting set(s) that collectively contain all of the edge(s) 1840, and identifying the common network traffic device(s) that service the selected sets as the locations to deploy IDS sensor(s) within the network infrastructure 1850.

In an embodiment of the present invention, the selecting set(s) that collectively contain all of the edge(s) 1840 may further include selecting set(s) that cover critical path(s) through the network infrastructure that led to a critical asset. The set selection method may further include selecting set(s) that cover critical path(s) through the network infrastructure that starts at an assumed threat source. Further variations of this embodiment may allow the set selection method 1840 to include selecting a minimal number of sensors necessary to cover critical path(s) through the network infrastructure. The set selection method 1840 may also further include utilizing a greedy algorithm. The greedy algorithm favors large sets that contain edge(s) that are infrequently used. In this regard, frequency is the number of times an edge appears across all sets.

In an embodiment of the present invention, the method 1800 for identifying locations to deploy on IDS sensor(s) within a network may further include prioritizing alerts from IDS sensors deployed within the network infrastructure using at least one attack graph distance to at least one critical asset. Attack graph distance may be measured in multiple ways such as: 1) the number of edges that are traversed to reach critical assets; 2) the number of protection domains crossed; and 3) the number of network traffic devices.

Example

Whenever an athlete is drafted to a league whether it is NFL, NBA, MLB, or any sport league, an Initial Stock Listing (ISL) will be issued or created based on the ranking during the draft of that particular athlete. For example, the table as shown in FIG. 19 shows the ISL prices for athletes drafted during the draft based on the draft round and position according to an embodiment.

This ISL pricing calculation, described in the table of FIG. 19, is implemented using a rule-based system and will be made available for the users to trade the stock up until the athlete plays the first game. Once the athlete starts the first game, a formula that provides live calculation for stocks will be used.

The stock valuation computation that works in real-time on the trading platform is based on the play points, past performance of the athlete, spot on depth chart and a position. The formula may increase or decrease the value of the stock per play as the game progresses.

$$\text{Increase/decrease in a stock value} = A\% * \text{Play Points} + B\% * \text{Past Performance} + C\% * \text{Spot on Depth Chart} + D\% * \text{Athlete's Position}; \quad \text{formula (1)}$$

where A+B+C+D is 100%; where A, B, C, and D are percentages that can range between 0% and 100%.

FIG. 20 shows Play Points that are calculated per play for each athlete involved in the play according to an embodiment. The values as shown in the table of FIG. 20 are used in formula (1).

FIG. 21 shows past performance points allocated for an athlete involved in the play according to an embodiment. The values as shown in the table of FIG. 21 are used in formula (1).

FIG. 22 shows Spot on Depth Chart that is translated into a value according to an embodiment. The values as shown in the table of FIG. 22 are used in formula (1).

FIG. 23 shows the Athlete's Position translated into a value according to an embodiment. The values as shown in the table of FIG. 23 are used in formula (1).

INCORPORATION BY REFERENCE

All references, including granted patents and patent application publications, referred herein are incorporated herein by reference in their entirety.

- U.S. Patent Application Publication 20220070549A1, titled "Methods and systems for transmitting highlights of sporting events to communication devices"
- U.S. Pat. No. 7,136,877, titled "System and method for determining and controlling the impact of text"
- U.S. Pat. No. 8,512,150, titled, "System and method for collecting and using athlete information"
- U.S. Pat. No. 8,635,146, titled "Sports share trading system and method"
- U.S. Pat. No. 9,203,861 titled "Methods and systems for determining hardening strategies"
- U.S. Pat. No. 9,436,822 titled "Virtual browsing environment"
- U.S. Pat. No. 10,956,184 titled "Malware detector"
- U.S. Pat. No. 9,846,588 titled "on demand disposable virtual work system"
- U.S. Pat. No. 8,082,452 titled "Protecting sensitive data associations"
- U.S. Publication 20100054481 titled "Scalable distributed data structure with recoverable encryption"
- U.S. Pat. No. 8,566,269 titled "Interactive analysis of attack graphs using relational queries"
- U.S. Publication 20100058456 titled "IDS sensor placement using attack graphs"

What is claimed is:

1. A system comprising:
   a processor, a memory, and a database;
   wherein the database comprises a list of athletes; a historical performance of an athlete; a game schedule; and a data set comprising the athlete playing a game as per the game schedule; and
   the processor is configured for:
   receiving first data of the game in real-time;
   processing information regarding the game at a computing apparatus to determine that a highlight of the game is to be conveyed to a mobile communication device of a user;
   transmitting second data comprising the highlight of the game to the mobile communication device over a wireless network during the game;
   determining a recommendation, using a machine learning model comprising artificial intelligence of a recommendation engine, to the user of a stock of the athlete for a future period;
   determining a stock price associated the stock of the athlete in the real-time based on a computation metric comprising a performance of the athlete in the game in the real-time, the highlight of the game, and the historical performance of the athlete, wherein the stock price of the athlete is computed using a blockchain technology;
   causing the mobile communication device to present an option for the user to trade the stock at the stock price relating to the athlete of the game; and
   transmitting third data comprising the stock price to the mobile communication device over the wireless network to allow the user to trade the stock of the athlete of the game on the mobile communication device; and
   executing a part of the game on the mobile communication device and trading of the stock in the real-time relating to the athlete while the game is occurring.

2. The system of claim 1, wherein an application program interface provides a stream of the first data of the game in the real-time to the database.

3. The system of claim 1, wherein the computation metric is implemented on the blockchain technology to compute the stock price in the real-time and wherein the computation metric further comprises a placement of the athlete on a depth chart.

4. The system of claim 1, wherein the stock price is computed in a blockchain environment and a ledger of a transaction record of the stock associated with the athlete is stored in the blockchain environment.

5. The system of claim 1, wherein the blockchain technology is configured to facilitate at least one of a creation of a transaction of the stock, a recording of the transaction of the stock, a verification of the transaction of the stock, and a maintenance of the transaction of the stock.

6. The system of claim 1, wherein the blockchain technology is configured to maintain a profile of the athlete and statistics of an overall performance of the athlete in a blockchain environment.

7. The system of claim 1, wherein the system further comprises a cyber security module configured for providing security for the system and the first data, the second data, and the third data on a trading platform of the system.

8. The system of claim 1, wherein the system is configured to allow the user to access portfolio holding, cash value, and buying power through an account of the user.

9. The system of claim 1, wherein the system is configured for the user to trade the stock at the stock price in the real-time as the game is in progress.

10. The system of claim 1, wherein an emotion state of one or more users is used in determining the stock price relating to the athlete in the real-time.

11. The system of claim 1, wherein the machine learning model comprises at least one of a Naive Bayes, a Logistic Regression, a Support Vector Machines, a Convoluted Neural Network, a Recurrent Neural Network, and a Deep Neural Network.

12. The system of claim 1, wherein the stock price is dynamic and is changing in the real-time while the game is in progress.

13. The system of claim 1, wherein the system is configured for setting a watch list comprising one or more preferred athletes by the user.

14. The system of claim 1, wherein the system displays a watchlist comprising one or more athletes of the game, wherein the watchlist is dynamically changed based on a ranking of the athlete in the real-time.

15. A method comprising:
receiving first data of a game in real-time;
processing information regarding the game at a computing apparatus to determine that a highlight of the game is to be conveyed to a mobile communication device of a user;
transmitting second data comprising the highlight of the game to the mobile communication device over a wireless network during the game;
determining a recommendation, using a machine learning model comprising artificial intelligence of a recommendation engine, to the user of a stock of an athlete for a future period;
determining a stock price associated the stock of the athlete in the real-time based on a computation metric comprising a performance of the athlete in the game in the real-time, the highlight of the game, and a historical performance of the athlete, wherein the stock price of the athlete is computed using a blockchain technology;
causing the mobile communication device to present an option for the user to trade the stock at the stock price relating to the athlete of the game; and
transmitting third data comprising the stock price to the mobile communication device over the wireless network to allow the user to trade the stock of the athlete of the game on the mobile communication device; and
executing a part of the game on the mobile communication device and trading of the stock in the real-time relating to the athlete while the game is occurring.

16. The method of claim 15, wherein at an end of the game, a statistic of the game and a profile of the athlete are revised and appended as a new block in a blockchain.

17. The method of claim 15, wherein the stock price is determined based on one or more factors comprising in-game statistics, a role of the athlete, age of the athlete, experience of the athlete, and season awards of the athlete, and achievements of the athlete.

18. The method of claim 15, wherein the method is configured to receive the first data of the game in the real-time via a direct connection to a scoreboard of the game.

19. A non-transitory computer-readable medium having stored thereon instructions executable by a computer system to perform operations comprising:
receiving first data of a game in real-time;
processing information regarding the game at a computing apparatus to determine that a highlight of the game is to be conveyed to a mobile communication device of a user;
transmitting second data comprising the highlight of the game to the mobile communication device over a wireless network during the game;
determining a recommendation, using a machine learning model comprising artificial intelligence of a recommendation engine, to the user of a stock of an athlete for a future period;
determining a stock price associated the stock of the athlete in the real-time based on a computation metric comprising a performance of the athlete in the game in the real-time, the highlight of the game, and a historical performance of the athlete, wherein the stock price of the athlete is computed using a blockchain technology;
causing the mobile communication device to present an option for the user to trade the stock at the stock price relating to the athlete of the game; and
transmitting third data comprising the stock price to the mobile communication device over the wireless network to allow the user to trade the stock of the athlete of the game on the mobile communication device; and
executing a part of the game on the mobile communication device and trading of the stock in the real-time relating to the athlete while the game is occurring.

* * * * *